United States Patent [19]

Overend et al.

[11] Patent Number: 5,379,340

[45] Date of Patent: Jan. 3, 1995

[54] TEXT COMMUNICATION SYSTEM

[75] Inventors: Sean K. Overend, Plymouth; John N. Mawhood, London, both of United Kingdom

[73] Assignee: Betterprize Limited, London, United Kingdom

[21] Appl. No.: 739,768

[22] Filed: Aug. 2, 1991

[51] Int. Cl.[6] ............................................ H04M 11/00
[52] U.S. Cl. ............................................. 379/93; 379/96; 379/98
[58] Field of Search .................... 379/96, 97, 98, 94, 379/93, 100; 358/400, 405

[56] References Cited

U.S. PATENT DOCUMENTS

| | | | |
|---|---|---|---|
| 4,713,780 | 12/1987 | Schultz et al. | 379/95 |
| 4,772,955 | 9/1988 | Kurahayashi et al. | 358/444 |
| 4,807,276 | 2/1989 | Okabe | 379/93 |
| 4,866,707 | 9/1989 | Marshall et al. | 370/94.1 |
| 4,910,765 | 3/1990 | Matsuse et al. | 379/100 |
| 4,964,154 | 10/1990 | Shimotono | 379/93 |
| 5,068,888 | 11/1991 | Scherk et al. | 379/96 |
| 5,095,375 | 3/1992 | Hisano | 379/100 |
| 5,140,439 | 8/1992 | Tanaka | 358/405 |
| 5,155,601 | 10/1992 | Toyama | 358/405 |
| 5,159,630 | 10/1992 | Tseng et al. | 358/483 |

FOREIGN PATENT DOCUMENTS 0063270  4/1983  Japan ..................................... 358/405

Primary Examiner—Curtis Kuntz
Assistant Examiner—Stella L. Woo
Attorney, Agent, or Firm—Richard M. Goldberg

[57] ABSTRACT

A communication system includes a number of terminals, each allowing the input of a text message represented as digital symbols, and storing the text message, and including modems for encoding the text message for transmission via a public telecommunications network to a remote terminal, the terminals also being arranged to receive acknowledgements from the remote terminal that such text messages have been received, and to re-attempt transmission in the event of a transmission failure or the absence of such an acknowledgement, and the terminals further being arranged to automatically answer a call placed via the public telecommunications network, to receive and decode a text message from a remote terminal included in such a call, to store the received text message, to transmit a signal acknowledging receipt of the received text message to the remote sending terminal, and to allow retrieval of the stored text message.

9 Claims, 10 Drawing Sheets

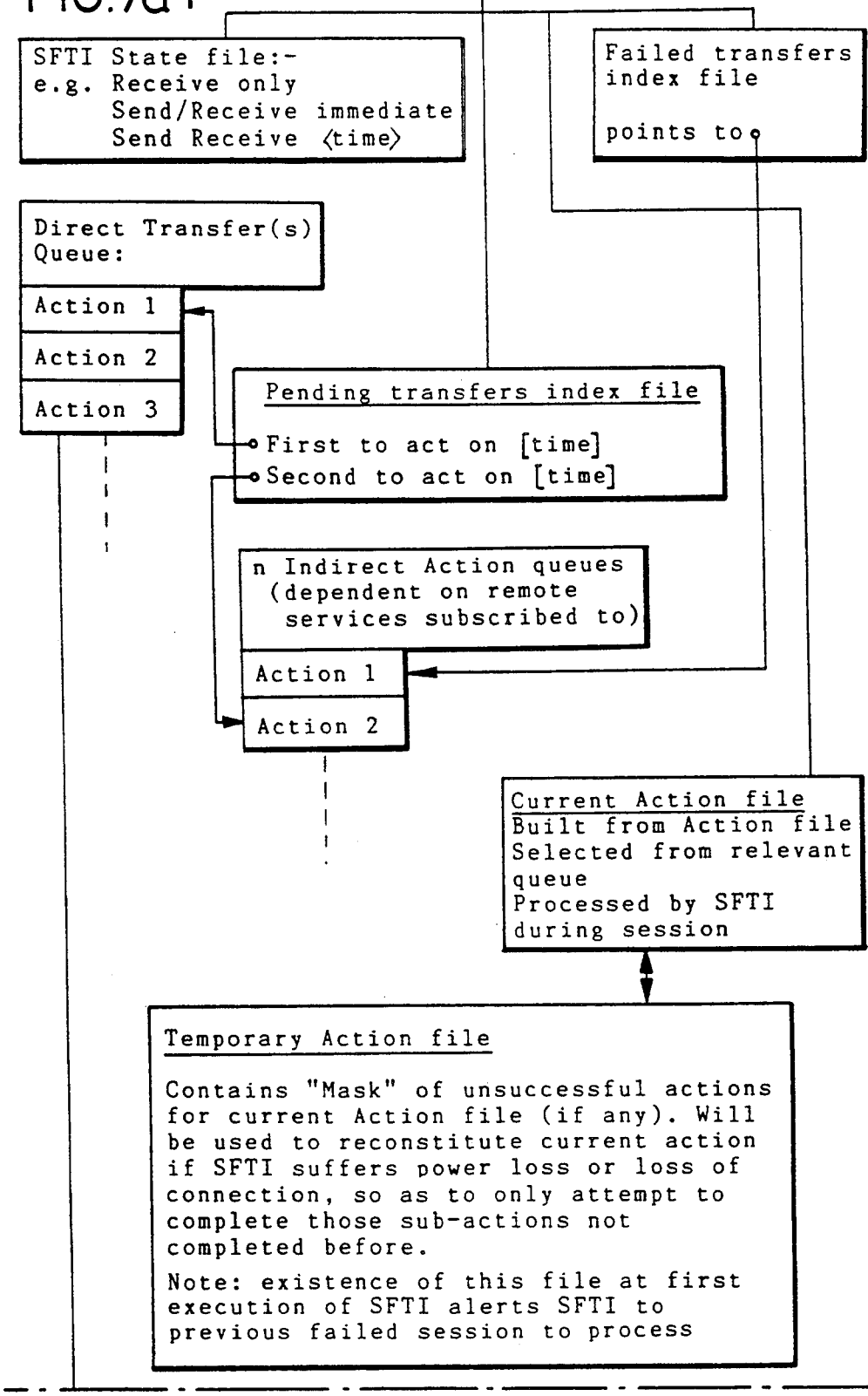

```
Typical format:
# action
CALL <remote ident>
DELIVER <recipient name> <local file name> <status of file after>
                                             transmission
                        [if compressed/    [e.g. if a pending
                         otherwise          file, may be
# end action             processed          preserved in
                         points to]         pending area,
                                            deleted, or archived
                                            to non-eraseable
                                            store, then delete.]
```

PENDING TRANSFERS AREA
Note: Actions may be converted between types:
e.g. Failed transfer renewed to pending and
vice versa. Direct made indirect and vice versa.
Possible to alter timing and sequences on index
file.

02-Aug-1991 09:32:14 ** Start of new month log  ①
02-Aug-1991 10:16:07 ** Dialling sean1
02-Aug-1991 10:16:46 ** Document transfer abandoned
02-Aug-1991 10:16:51 ** Session completed.

02-Aug-1991 10:17:32 ** Dialling sean1  ①A
02-Aug-1991 10:20:27 ** Document transfer abandoned
02-Aug-1991 10:20:33 ** Session completed.

02-Aug-1991 10:20:52 ** Dialling sean1
02-Aug-1991 10:21:37 ** Connected to sean1 (using full SFTI)
02-Aug-1991 10:21:39 ** Sending file  ② ③
                                  "D:\ODYSSEY\PENDING\LON00542.ZIP"  ④
02-Aug-1991 10:21:39 ** of 2874 bytes
02-Aug-1991 10:22:07 ** Receipt acknowledged
02-Aug-1991 10:22:25 ** Session completed.

02-Aug-1991 16:32:19 ** Got call from - LON002
02-Aug-1991 16:32:24 ** Receiving file addressed to john  ⑤
02-Aug-1991 16:32:54 ** Document LON00271.ZIP of 3112 bytes
                                  received successfully
02-Aug-1991 16:33:10 ** The following compressed files have been
                                  moved to mailbox JOHN
02-Aug-1991 16:33:10 ** START OF LIST
02-Aug-1991 16:33:10 ** D:\ODYSSEY\HOLD\JOHN\LON00271.ZIP
02-Aug-1991 16:33:10 ** END OF LIST
02-Aug-1991 16:33:16 ** Session completed.

FIG.7b

TEXT COMMUNICATION SYSTEM

FILED OF THE INVENTION

This invention relates to a system for text communications between a plurality of terminals.

DESCRIPTION OF THE BACKGROUND ART

It is known to transmit messages using a telex. In telex communication, coded digits are transmitted from one terminal to another, which is dialled up using a number found from a publicly available directory. The receiving terminals signals back to indicate that contact has been made, and acknowledge receipt of a message. The message is printed at the receiving terminal.

It is also known to communicate messages by facsimile. In facsimile transmission, a document is scanned and encoded using image compression coding. The encoded image (not the text it represents) is transmitted to a facsimile receiver, where it is printed out.

Text may also be transmitted using electronic mail systems, in which a transmitting terminal dials up a central message storage computer and transmits a message to be stored under a designated mailbox therein. The intended recipient of the message will then later dial the central computer and read his message. Similar text communication systems include bulletin board systems, in which messages are stored in a bulletin board computer and subsequently read by the intended recipient.

The above systems may thus be divided into point to point systems (telex and facsimile) in which messages are transmitted direct to the recipient, and stored and collect systems (electronic mail) in which a message is deposited in a mailbox and then subsequently read.

SUMMARY OF THE INVENTION

The invention provides a communication system comprising a plurality of terminals, each of which comprises a computer connected through a modem to a public telecommunications network, each terminal being arranged to receive messages whilst unattended and to transmit back an acknowledgement that the message has been received, and to store the message in electronic form. Each terminal is arranged also to be able to transmit messages, and to keep a number of messages ready for transmission, and upon a failure to successfully transmit a message, to keep retrying.

The system therefore provides a flexible text communications system enabling a user to "post" a text message into the system, secure in the knowledge that it will eventually be dispatched to the intended recipient and its receipt will be acknowledged.

Very preferably, the system includes a high level check that the message has been received intact; for instance, the file size of the message to be transmitted may also be transmitted, and after receipt the receiving station may check the size of the file received. The acknowledgement in this case is made conditional upon the received file size matching that transmitted.

The system according to preferred embodiments of the invention can be operated by office staff with a minimal knowledge of computers or telecommunications. The invention is particularly suitable for use for communication between the offices of law firms, or between law firms and Courts, or between law firms and clients, because it provides a relatively high degree of certainty that the message has arrived uncorrupted, together with acknowledgement by the recipient that the message has arrived, and preferably the date and time of receipt. The use of point to point text transmission also involves the transmission of only a fraction of the data involved in facsimile transmission, and is correspondingly much cheaper.

Further, a received document can be edited using standard word processing software, and retransmitted back immediately. This is of particular value in drafting complex and lengthy legal documents.

Still further, in a preferred embodiment, the analogy to electronic post is extended by ensuring that once a copy of the message is transmitted, the original is deleted from the transmitting station so that only a single copy of the message is in existence. This would not generally be possible in the prior art, without the inventive features of acknowledgement and checking of messages provided herein. This provides the advantage that multiple copies of a single document do not simultaneously exist; the problems caused by the simultaneous existence of a single document in various stages of editing will be familiar to the reader.

This invention relates to a system which permits one or more terminals to communicate by means of a communications channel (at any one time for each link possible between terminals only 2 terminals may be in communication to the exclusion of any other terminal wishing to communicate with them on the same link for the duration of that session) permitting the automatic response to a communications link request, negotiation of link and session parameters and transfer of data files from a transmitting terminal to a receiving terminal under automatic operation and with capability to automatically resume execution of data file transfer requests notwithstanding any loss of operational power to the terminals or loss of the communications link by extraneous causes, without requiring identity verification of the terminal requesting to transfer data files either by means of no verification being required or by means of a universal verification of identity for all like terminals.

The invention in its elements is illustrated by the attached state diagrams, one for the "TX" mode and one for the "RX" mode, dealing with transmission requested functions of the invention and received transmissions functions respectively.

In a preferred implementation of the invention the terminal system will be capable of operating in receive transmissions mode only, such that, notwithstanding the existence of any stored action datafile which would otherwise require execution by the transmission functions, only reception of transmissions from other terminals will be transacted until such time as a change of this state is effected, under user or system control by reference to external parameters, such as time or other events occurring. For example, to allow stored action data files specifying transfers to be executed only after a certain local time to make best use of telecommunications service charging rates differentiated by usage within certain time periods.

Whereas there exists in prior art implementations of systems comprising similar functions requiring that communications links may only be established with another terminal, but appropriate identification verification information is supplied prior to any access to the call recipient system being made available, this invention makes no such requirement and thereby greatly facilitates the automated transfer of data files between such terminals as have the need for identities to be known and verification information disseminated, the only identification information being required by any user of such terminal being the communications node identifier of the desired recipient terminal (such as a telephone number).

Whereas in prior art systems exist which provide communications links for automated file transfer, this invention does not permit any incoming data file to be transmitted into the store of the receiving terminal other than into a holding area wholly under the control of the software arranged to implement the system, thereby permitting the system to operate to implement the avoidance of data file name clashing and by means of the aspects to be described below to permit unique identification and verification of the received files through transfer logs maintained by the system. Whereas this invention also entails that, on the completion of any data file transfer the receiving terminal makes verification through the store or disk operating system local to it against the integrity checking data previously supplied by the transmitting terminal corresponding to the data file just sent. This independent check is carried out after completion of the execution of the file transfer protocol and provides a second program independent level of verification and data integrity checking which goes to the verification that no errors have occurred in the process of storing of the data file just transferred. In addition, for evidential purposes, as acknowledgement is made by the receiving terminal after verification, the invention by means of the maintenance of a transfer log data file on the sending and receiving terminals (which record the fact of acknowledgement by independent verification of the integrity parameters of the data file sent in a manner that requires no user intervention) this invention thereby facilitates use of the transfer log record as evidence for legal purposes of the fact of the full and complete receipt of the datafile transfer completed.

In a preferred implementation where content verification is required at a higher level, this invention permits the automatic archiving of a copy of the transferred data file to uneraseable store within the transmitting terminal.

Whereas the invention requires use of discrete logical areas for storage of all received data files by reference to identification data supplied by the transmitting terminal, the invention permits the operation of a secure system for receipt of data files without risk of overwriting existing data files on the receiving terminal's store and thereby automatically implementing methods for avoiding data file name clashing and automatic unattended reception insofar as the constraints of the receiving terminals' local store capacity permit.

The invention's use of logical areas discreet to its operation permits the implementation of a terminal with logical areas for reception which are also linked to logical areas for collection by other terminals (upon supply of identification data for such collection logical area) to the effect that data files therein contained may be retransmitted to a receiving terminal for such a connected logical reception and collection area pair. The same aspect of this invention is for the purposes of non-coincident transmission and collection by different terminals of the same data files without requirement for identity verification (although in a preferred implementation identity verification may be implemented by the operator).

The invention's operation of discreet collection areas permits the "polling" by a remote terminal initiating a request to a terminal for transmission to it of any files held in a logical data area by reference to the logical data area name alone and without requirement of identification of any data file names or content thereof.

The invention's operation of such logical areas permits the establishment of logical areas having attributes which are for collection one time only on multiple occasions dependent on operator preference. Such facility allows the implementation of multiple remote collections of data files in the manner previously described for collection one time only. All of these facilities provide a means of securely regulating the retrieval by remote terminals of data files from an unattended terminal by automatic operation of the system.

Other preferred aspects and embodiments of the invention are as described and claimed hereafter.

BRIEF DESCRIPTION OF DRAWINGS

The invention will now be illustrated, by way of example only, with reference to the accompanying drawings, in which:

FIG. 7A is a diagram showing transaction queue management; and

FIG. 7B is a diagram showing a transfer log.

DESCRIPTION OF PREFERRED EMBODIMENTS

Figure 1:
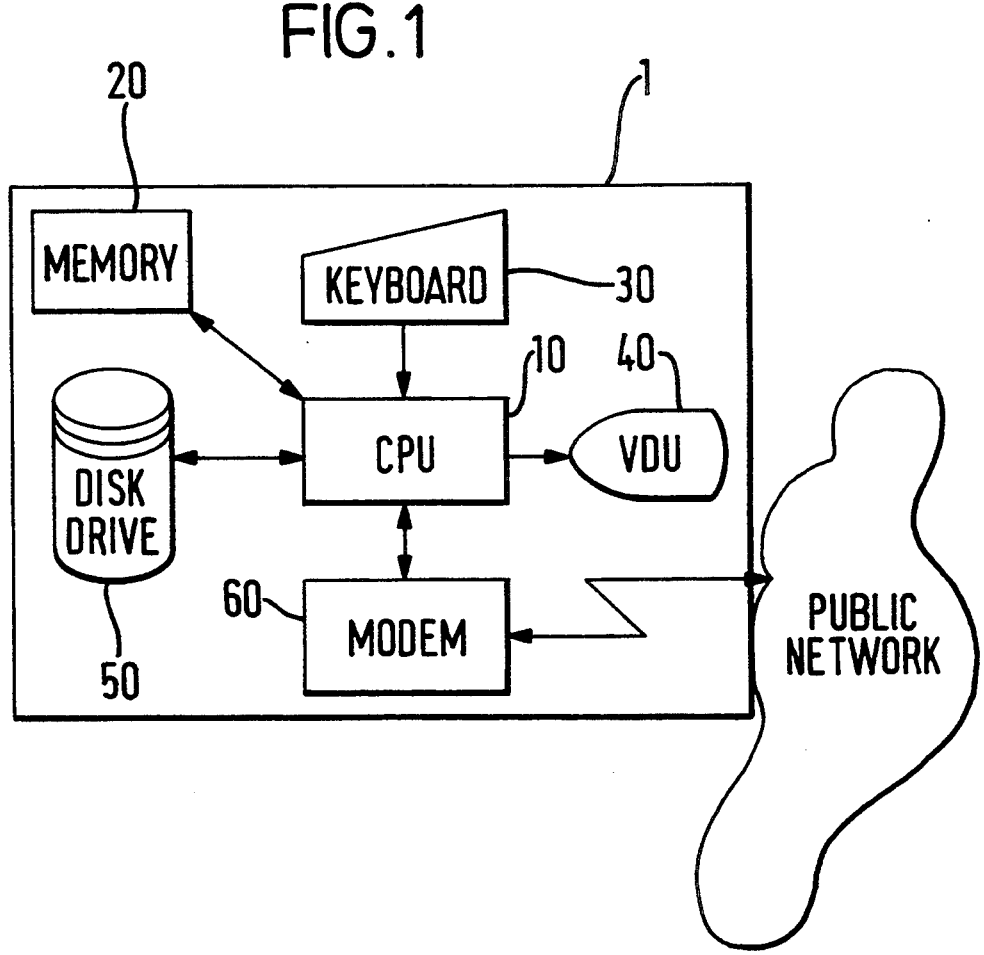
FIG. 1 shows schematically a terminal according to a preferred embodiment of the invention connected to a public telecommunications network.

Referring to FIG. 1 a terminal station 1 for use in a system according to a preferred embodiment of the invention comprises a CPU (central processor) 10 coupled to a memory section 20 (typically comprising program, read only memory or ROM and working read-write or random access memory RAM), a keyboard 30 for manual data input, a VDU (visual display unit) 40 such as a cathode ray tube or liquid crystal display, a disk drive or other mass storage unit 50 (for example, a hard disk drive, typically of the Winchester type) and a modem 60 connectable to a telephone line or other communication channel. A floppy disk drive may also or alternatively be provided, to allow text files to be transferred in or out on disk.

The whole terminal 1 may be typically provided by a personal computer (PC) for example of the IBM (TM) compatible type, expanded to include the hard disk 50 and modem 60.

For example, in one embodiment the CPU 10, memory 20, keyboard 30, VDU 40 and disk drive 50 may all be provided as an IBM PC80 or XT compatible such as the NEC PC. It is preferred that the memory 20 should include 640K read-write memory, and that the hard disk 50 should have a capacity of at least 1.5 megabytes.

The modem 60 employed in the invention needs to have the capacity to provide automatic answering (auto-answer) and is preferably "smart" modem. Suitably, the modem is arranged to employ the control codes developed by Hayes (i.e. is Hayes compatible). Examples of suitable modems are the Miracom Courier HST 9600 modem operating at 960 baud employing international standard V22 bis 2400, V22 1200, and V21 300 transmission protocols, providing MNP 1–5 error correction data encoding; the Miracom Quad 2400 (four speed) modem operating at 2400 baud, V22 vis 2400, V22 1200, V21 300 or V23 1200/75 rates employing the same error correction as above; or the Miracom 2400E (three speed) modem which offers the facilities of the Quad 2400 except V23 transmission rates.

The modem 60 may be connected to a standard IBM compatible PC providing the CPU 10 via the RS232 socket thereon.

Figure 2:
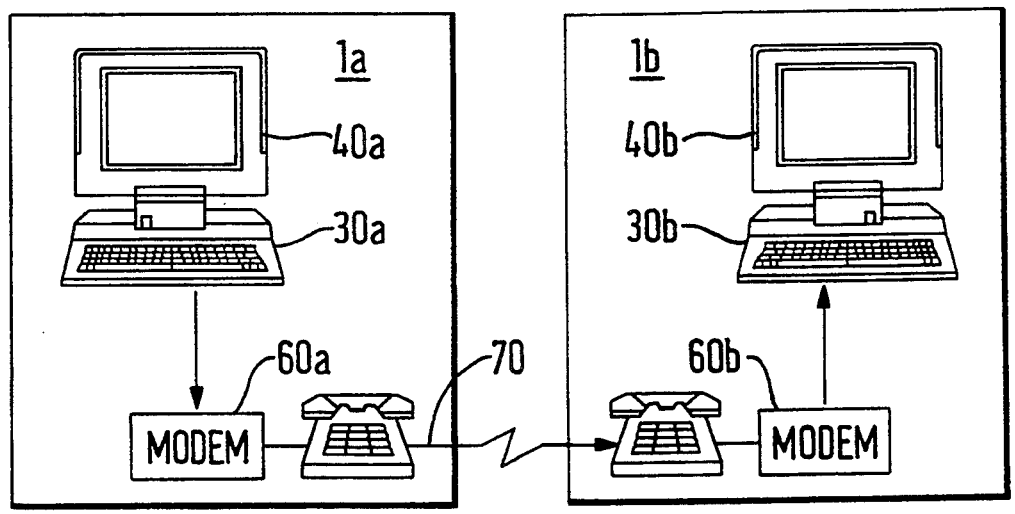
FIG. 2 shows schematically two terminals in text communication.

Referring to FIG. 2, where a message is to be transmitted from a first station 1A to a second station 1B, the message is typically input by a user via the keyboard 30A and stored as a file (typically a word processor file) on the disk drive 50. The user will then instruct the CPU 10A to cause the transmission of the file, by issuing, an appropriate command via the keyboard 30A (or, alternatively, using some other form of input device such as a mouse). The user inputs the destination to which the file is to go, and the CPU 10A provides a phone number and causes the modem 60A to seize the telephone line 70 to which it is connected, generate appropriate tone or pulse dialling signals to dial the required number, establish the link and transmit the message.

At the receiving station, 1B, the modem 60B detects the ringing signal and answers the incoming call. Typically, the modem will at this point sense the speed of the incoming signal and set its receiving rate accordingly, if it is a multi-rate or standard modem. The text data is transmitted by the modem to the CPU 10B, and stored as a file on the received station disk drive 50B.

When the message is received, the CPU 10B of the receiving station 1B generates an acknowledgement message which is transmitted back via the telephone line 70 through the receiving modem 60B to the transmitting modem 60A, and is logged and stored by the transmitting station CPU 10A.

Figure 3:
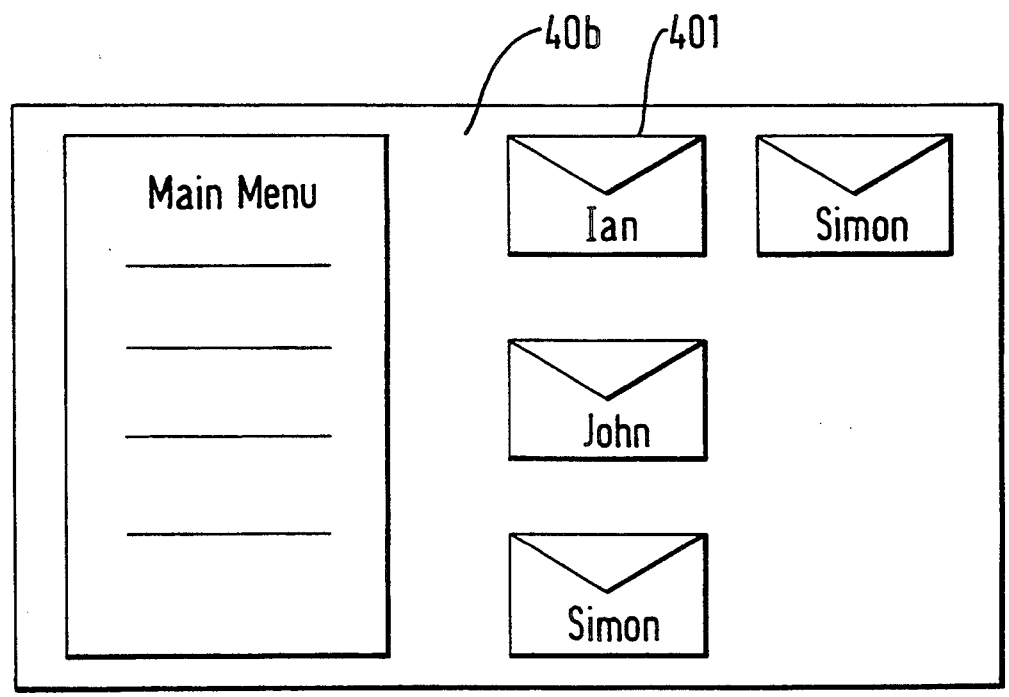
FIG. 3 shows schematically a display upon a terminal having received a message.

To indicate that a message has been received, the VDU 40B of the receiving station displays an envelope icon 401 corresponding to the received message, preferably, as shown, with an indication of the identity of the intended recipient as shown in FIG. 3.

It will be noted, in connection with the above description, that transmission is direct from one station to the other and not via a central mail computer. It will further be noted that each station, when acting as the receiving station 1B, will answer a call without a password checking stage; the object of the invention is that each terminal should, like a facsimile receiver, accept any message directed to it.

Figure 4:
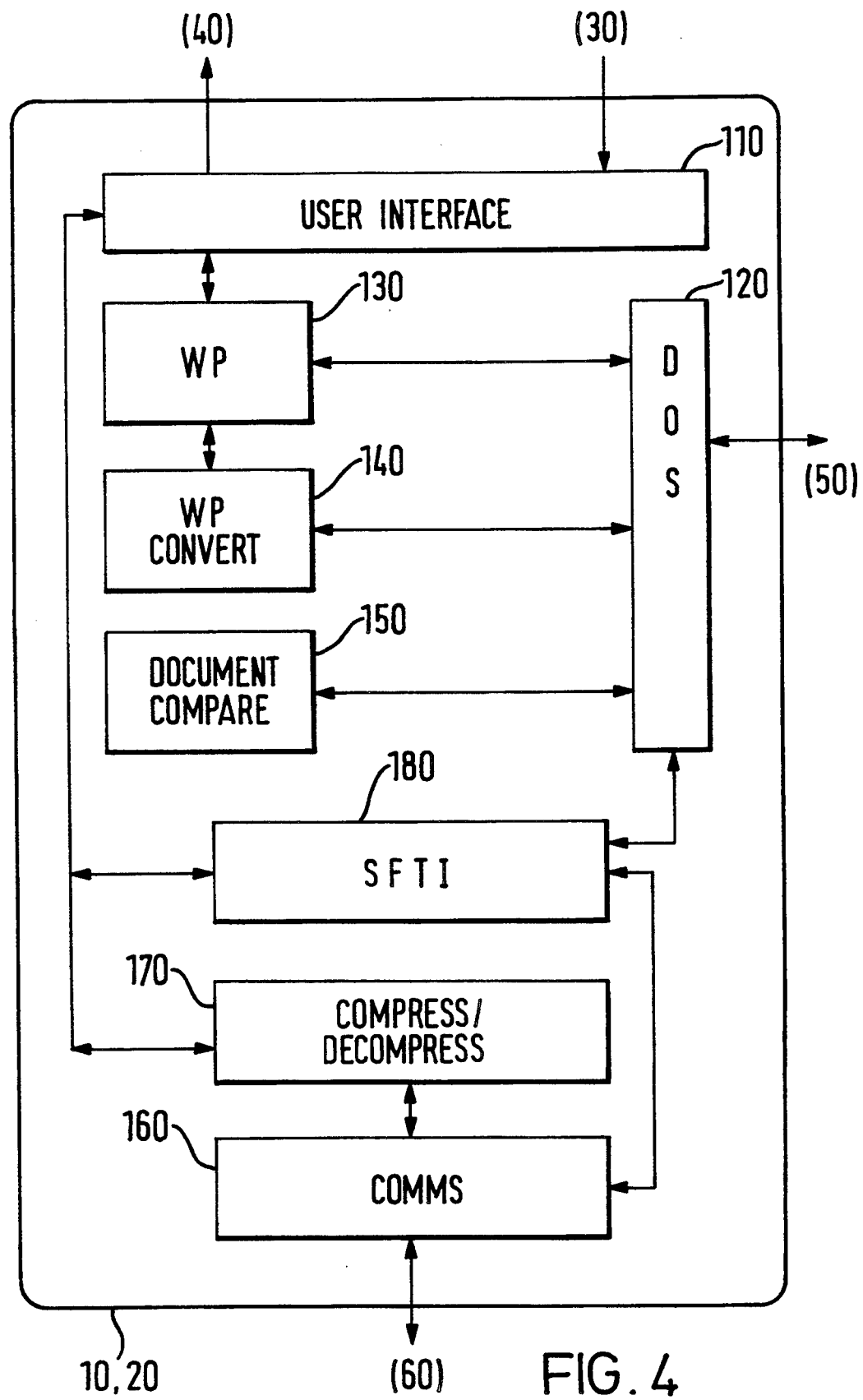
FIG. 4 shows schematically the arrangement of programs within the terminal.

FIG. 4 shows generally a schematic arrangement of the software held in the memory 20 under control of which the CPU 10 operates to embody the invention. A user interface program, typically of the WINDOWS(TM) type developed by is provided, for handling inputs from the keyboard 30 or other input device (e.g. mouse) and screen displays on the VDU 40. An operating system communicates with the hard disk 50; for example, the disk operating system (DOS) provided by Microsoft for operation with the IBM PC.

A word processing program 130 is arranged to receive inputs and generate outputs via the user interface 110 and to handle text files via the disk operating system 120. A user may thus create a text file for storage on the hard disk 50, or within random access memory 20.

As different terminals may employ different word processors 130, preferably a word processing format conversion program 140 is provided for translating between the character formats and control codes used by different word processing files. Thus, an incoming message in one format may be converted to be readable by another, or a text file generated using a given word processor may be converted to the format of another for transmission (or, indeed to plain ASCII).

By way of example, the format conversion program may be the Software Bridge (TM) product which is commercially available. The conversion program 140 may be arranged to detect the format in which a document to be converted is, and effect format conversion automatically; for instance, when a received document is found to be in Wordperfect (TM) format and the word processor is in another predetermined format, the WP format converter 140 converts from Wordperfect (TM) to the predetermined format automatically.

Optionally, a document comparison program 150 may be provided such as the Docucare (TM) product; products of this kind are arranged to compare two files (for example a received file as a subsequently edited file) and to display differences between the two (for example, by highlighting). This is particularly useful when preparing complex legal documents.

A communications package 160 (for example the Odyssey (TM) package mentioned above) is connected to the modem 60 by the serial port and controls reading files from and writing files to the modem 60.

A compression and decompression package 170 receives a text file and produces a compressed text file, and vice versa; the compression may be the PKZIP-/UNZIP package, for may execute any suitable compression/decompression (for example, Lempel-Zir).

Controlling the overall communications process is the secure file transfer interface program 180 forming an important part of the present invention. The SFTI 180 is arranged to respond to user commands via the user interface 110, to control the receiving and acknowledging of messages, and the transmitting of messages.

It is also possible for a user to command a terminal to interrogate another terminal to collect a message already received by that other terminal, and correspondingly for an interrogated terminal to deliver a received message. Whilst sending and receiving messages requires no password, and is open to any member of the public, collecting a message does require a password. A terminal will not deliver a message when remotely interrogated by another unless the correct password is employed. Likewise, it may be provided that whilst a message may be received by a receiving terminal, it can only be read (i.e. displayed on the VDU 140 or filed off onto a disk) upon typing in a password via the keyboard 30.

The SFTI 180 is arranged to be a "state machine"; that is, to pass between clearly define states in limited and clearly defined transitions. This provides a particular advantage that the current state may be recorded on non-volatile store (e.g. hard disk 50) so that if power is lost temporarily the terminal 1 upon recovering power can read the present state from the hard disk and return to the same operation where it left off.

The SFTI 180 maintains a list of the text sending and text retrieving operations which it must perform. The present operation which it is performing is likewise stored on a non-volatile store (e.g. the hard disk 50) and thus, upon recovering, the SFTI 180 can establish which job it was processing and resume the operation after power loss.

The list or queue of jobs in hand is continually reviewed; once one job is completed, the next in the queue is processed.

The jobs or transactions in the list or queue may all be for immediate execution or may have times of execution specified so that the SFTI 180 may be left to transmit a document at a particular time.

Optionally, other programs may also be resident. For example, a database access program may be provided to enable access to selected databases and downloading of files therefrom; for example, for use in a lawyer's office, legal precedent or case law databases such as Lexis (TM) may be accessed. A file of passwords for such access may therefore be stored on the hard disk 50.

Likewise, programs to allow text conferencing via access to a central host computer may be provided; this allows several users to edit and process the same document in conference simultaneously, from different sites around the world.

The SFTI 180 maintains a logged file indicating each major event or task which it performs. Thus, each file transmitted and each file received are logged, together with the date and time. This provides a valuable record of messages transferred to and from.

The SFTI is very preferably arranged to control the operating system 120 such that when a file is successfully transmitted and acknowledged as being received from the distant terminal, it is deleted from the disk drive 50. Thus, only one copy of a message is in existence at a given time; this increases the security of the system and prevents confusion between multiple files with the same name having different text, or the same text.

DESCRIPTION FOR THE SFTI 180

The LIX SFTI is implemented as a program module within a number of modules compiling the current LIX application software for IBM compatible PC's running Microsoft Corp USA's (Microsoft) disk operating systems (DOS) versions 3.0 and above.

The SFTI and other modules for LIX application program are implemented in a combination of the programming language of a communications application program known as ODDYSEY, Copyright Skyro Software Limited and Micropack Limited both of Aberdeen, Scotland in the United Kingdom and of which the only individual author is Don Milne also of Aberdeen, Scotland in the United Kingdom; compiled executable program code and Microsoft's DOS batch command language.

The LIX application software integrates commercially available compression software being the programs known as PKZIP AND PKUNZIP published by PK Ware Inc. USA, current version No. 1.1. This compression software is utilised by the SFTI module to ensure the avoidance of datafile name collision in received files in named mailboxes, by the device of compressing all files received during a transmission (which are received into a temporary holding area on the processor's store) into one compressed data file which is given a unique holding name.

In the option of the transmitting, operator files selected for transmission may be compressed by the same compression software prior to transmission into a file whose name is generated to have a unique name for practical purposes (in that the incremented code using Alpha numeric characters forming part of the datafile name does not repeat in under 10,000 iterations makes the probability of the same sender transmitting over 10,000 compressed data files to the same recipient and the same mailbox name without the recipient opening any of the received data files and removing any from the mail box, is regarded to be beyond practical concern for this implementation).

The SFTI module determines whether a received data file is already in compressed form at the time of receipt and will not further compress if so. All received data files are, once in compressed form, copied from the holding area of the machine's store to the logical area within the machine store corresponding to "mailbox names" designated by the sending operator as the recipient's name. This is implemented by, within Microsoft DOS, creating a directory which is a sub-directory of the relevant global mailbox directory with the name of the recipient as designated by the transmitting terminal during the SFTI session.

TRANSMISSION OF FILES BY THE SFTI MODULE

In the current implementation the SFTI processes action files created by the main user interface module 110 by virtue of interaction with the user setting up desired transfers to be executed by the SFTI module. These action files are processed in a "queue" and have their contents individually processed by means of a temporary file during the execution of transmission sessions to the effect that the SFTI is for most practical purposes capable of resuming any transmission session automatically, notwithstanding any interruption due to power supply failure to the transmitting terminal or communications link loss, from the point after the last successful action executed by the SFTI during the previously abortive session. To enable this automatic resumption to operate the relevant terminal's software and data files are arranged to automatically invoke the LIX program upon power being restored to the CPU and store, by means of the automatic execution batch file of the Microsoft DOS. The SFTI module, by making a datafile record of its state on the machine's store is able to ensure that the SFTI module is reinvoked in the event of such an abortive interrupted session in send and receive mode (as opposed to receive only mode which normally would be invoked if the LIX software were invoked without the previous occasion of running having been an interrupted execution of the SFTI module in send/receive mode).

COLLECTION MAILBOXES

By means of the LIX user interface module 110 of the LIX software, the user operator is enabled to select data files for placing into a logical area of the store of the machine so that the same data files may be available for collection automatically by a remote LIX terminal. By virtue of stored datafiles containing data supplied by the user operator the same logical areas of the store may have access restricted by way of a password, although this is not a requirement of the invention or the implementation.

The effect of this arrangement is that a remote LIX terminal may, in executing a stored action data file containing data provided at the instruction of the user operator, retrieve all the files held in such logical area by reference to the name of such logical area and on supplying the corresponding verification password for such area.

In the current implementation of the SFTI module the logical area corresponds to a sub-directory of the global director for all "collection mail boxes". Data files are copied into such sub-directories by the LIX user interface module on the completion of a user specified collection transaction.

As described in the SFTI invention technical description the implementation in the current LIX software permits 3 kinds of collection logical areas, or "mailbox".

SINGLE COLLECTION MAILBOX

The first is an ordinary collection mail box which has a name and may have a password (the current version of the SFTI module will only make collections by supplying a password for the desired mail box although it is technically feasible within the invention for no password to be required, this has not been implemented). On the SFTI receiving a call when a request for collection is made the name of the desired mail box to collect from is required and supplied by the remote terminal. Upon verification that the mail box exists on the local terminal's store the local terminal requires the provision of a password, if a password entry is found in the relevant data file. In the single collection only mail box implementation the first successful session via remote LIX terminal to provide the appropriate name and any password will collect by transfer a copy of all data files held at that time in the relevant mail box. The special feature of the single collection mail box implementation is that, on successful complete transfer of all data files to the remote terminal, the local SFTI module deletes all copies of the data files from the relevant mail box and removes the logical area or directory from the terminal's store (for reasons of housekeeping). This allow LIX to implement one of its particular features, namely that when the contents of a collection mail box have been collected the mail box contents do not remain (in the single collection implementation).

MULTIPLE COLLECTION MAIL BOX

In the multiple collection mail box implementation which is effected by setting of user defined data in a data file operated upon by the SFTI module, the SFTI operates in identical manner to the foregoing description of the single collection mail box, except that by virtue of holding copies of the data files contained in the relevant mail box in a temporary area the LIX SFTI module restores all the data files that would otherwise be deleted in the single collection implementation.

"THROUGH" MAIL BOX

The "through" mail box implementation is set by the user supplying relevant data for a data file read by the SFTI a given mail box name is treated as a "through mail box".

The effect of a "through mail box" is that all data files received into an incoming mail box of that name are automatically copied, immediately after a session in which they were received, to a collection mail box of the same name. By virtue of the original incoming data file copies being retained in the incoming mail box area the operator or user has the opportunity to examine all data files received into a "through mail box" notwithstanding that the contents of the outgoing mailbox "pair" may have been cleared by virtue of a collection by another remote LIX terminal before they are aware of the receipt.

"Through mail boxes" may also be designated, at user preference, multiple collection mail boxes in which case the copies of the data files received into the "pair" incoming mail box are restored to the collection mail box by the SFTI module upon every complete transmission.

LINK ERROR CORRECTION

In the current implementation of the SFTI module, link error correction is established, which is important to the operation of the SFTI at speeds in excess of 1200 baud as otherwise data transmitted between terminals during the automated session would be liable to line noise corruption, thereby compromising the reliability of the automatic operation on the SFTI send and receive functions. By way of data files recording the user's terminal capabilities, the particular modem device connected to the terminal may be designated as capable of providing link error correction itself. The SFTI will optionally provide link error correction in software by means of the Microcom Networking Protocol ("MNP") up to level 5 as published by Microcom Inc., USA. The link negotiation being conducted in accordance with the protocol and being capable of being established between the SFTI communications program (ODYESSY) and any other LIX terminal, irrespective of whether the link error correction in MNP is being provided by the remote terminal's modem or SFTI module, subject to conformance in the case of the modem with the published protocols.

In the current implementation of the SFTI module, where the SFTI module is required to provide link error correction, by virtue of the settings contained in the data files relevant to the settings of the program, any call which does not establish an MNP error corrected link will be automatically rejected prior to any SFTI session commencing.

FILE TRANSFER PROTOCOL

In the current implementation of the SFTI no negotiation of file transfer protocol between the LIX terminals during a SFTI session is required, notwithstanding the possibility arising out of the invention, as only one file transfer protocol available in the ODYSEEY communications program is best optimised for link error corrected communications, where the burden of overall error correction in the communications chanel is best provided by the link error correction in MNP. The file transfer protocol employed is therefore the implementation of 2 modem as published by Chuck Forsberg of, USA, but with the omission of any features in the 2 modem protocol not required for simple file transfer or resumption of file transfer to an existing file of the same name. This latter limitation is implemented in order to provide security against unauthorised manipulation of the operating system functions that would otherwise be available through Z modem to a remote terminal operated otherwise than by a sending SFTI module (e.g. a hacker).

MODEMS

In the current implementation of the SFTI module, the use of Modem responding to a minimum subset of the command set established by Hays Corp [USA] for their modem devices is assumed:

the "AT" command (in any case not case sensitive).

The "AT D" command followed by the required dialling number and

"AT H" command for optional disconnection, (if manipulation of the Data Terminal Ready line in the required manner does not produce a de-assertion of the Data Carrier Detect signal to the SFTI). It is a requirement of the current implementation of the SFTI that the modem is set to give "CONNECT" character string to the terminal to signify that a link has been established with the remote terminal modem.

These restrictions are merely implementation restrictions for the preferred modem operation now current.

The user operator can by means of defined data files operated upon by the SFTI provide any appropriate initialisation character string to be sent to the modem device connected to the terminal to facilitate its configuration in a manner consistent with operation of the SFTI. For the successful operation of the SFTI automatic receive mode, the modem device must be capable of automatic answering of an incoming call and, in a preferred implementation, if a modem implements international CCITT communications protocols above the speed of 2400 baud—the assumed minimum in the current SFTI implementation—be capable of automatic baud rate negotiation and connection with the remote terminal's modem device.

DATA COMMUNICATIONS EQUIPMENT TO DATA TERMINAL EQUIPMENT FLOW CONTROL

The current implementation of the SFTI permits, for the better reliability of the operation of the SFTI, that the data communications equipment to data terminal equipment ("DCE/DTE") link, that is between the modem device and the terminal, is subject to data flow control by means of the Request to Send/Clear to Send (RTS/CTS) Flow Control Protocol implemented in IBM compatible PC serial communications port connections. This is implemented at user operator preference and depends upon the terminal modem device being set to provide corresponding flow control via a fully configured DTDC physical link. RTS/CTS flow control is not set, when MNP is being provided in software.

TECHNICAL DESCRIPTION

Notes to Description

"Timeout applies"

Means that default timeout period will apply. SFTI will time down for period preset by user or configuration (as appropriate to medium and circumstances of the terminal). On expiry of timer failure action for indicated state will occur.

"Line drop detect applies"

Means that SFTI will monitor Data Carrier Detect assertion and while present will not interrupt action of SFTI. If deasserted will interrupt and failure action for indicated state will occur.

Prompt and send prompt, send and cognate expressions means that the SFTI sends characters described to the remote SFTI.

Display

Means that the SFTI reports, either to screen or other interface the characters or similar corresponding to the characters described.

Record

Means that the SFTI makes record in a data file on the terminal's store of the characters or similar corresponding to that described.

Language

Other than for characters described as Prompt and Send above, all words and characters may be in any language.

Figure 5A:
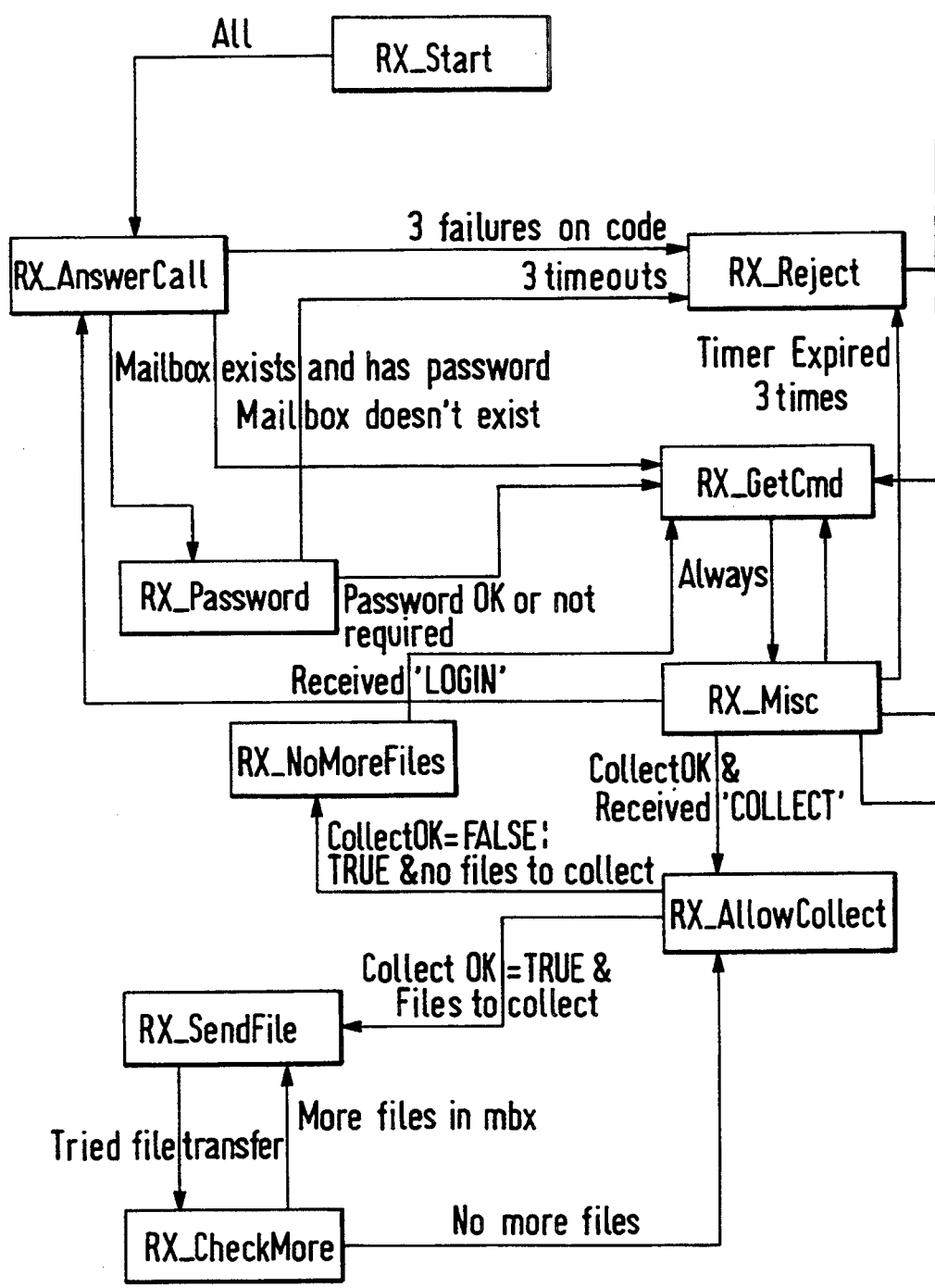
FIGS. 5A and 5B form a single FIG. 5 comprising a state diagram showing the operation of the SFTI program on receiving a message.
Figure 5B:
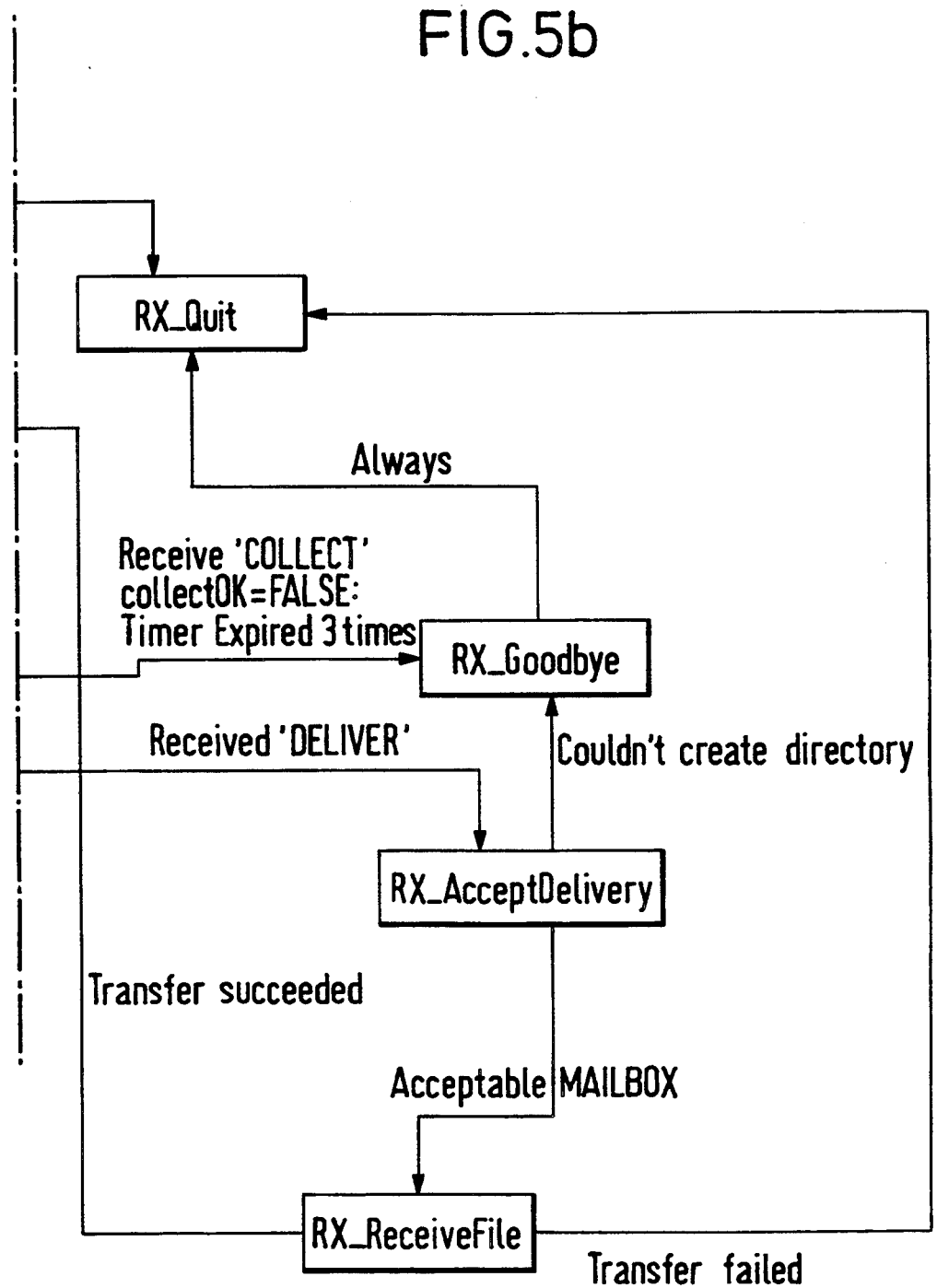
Figure 6A:
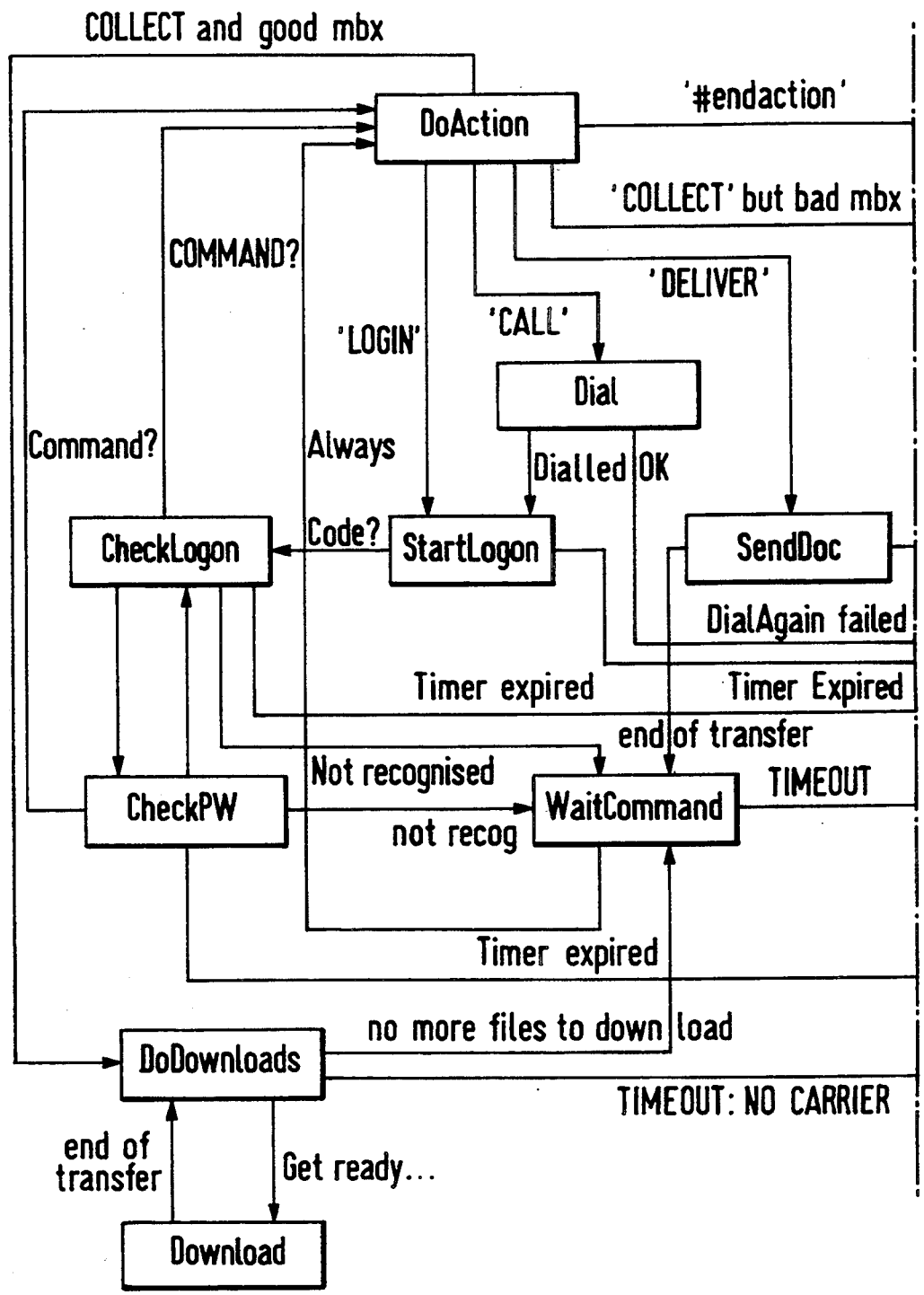
FIGS. 6A and 6B form a single diagram comprising a state diagram showing schematically the operation of the STFI program on transmitting a message.
Figure 6B:
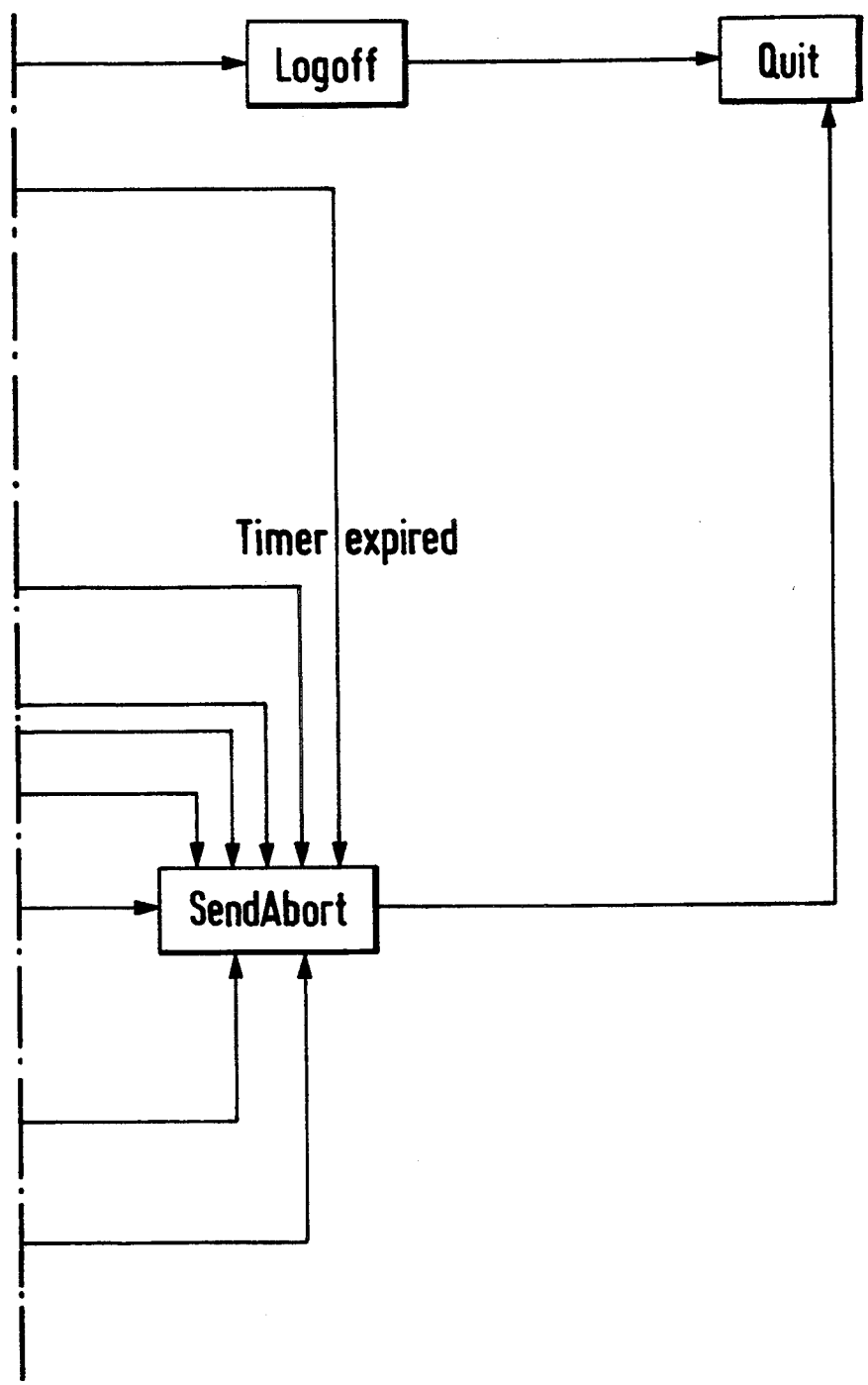

RX Mode (FIG. 5)

RX Start

On DCD being asserted commences action, otherwise waits for DCD or change of state initiated by TX Mode.

Puts up banner declaring authorship and ownership rights and trademark and version number.

RX Answer Call

Prompts remote for senders Code
"Hour LIX Code?"

Timeout and line drop detection apply, three prompts of "Hour LIX Code?" are made with default time out between each.

RX Reject

Send "Goodbye"
Record Call rejected in transfer log.
Drop line (by dropping DTR or high level command to communications device to disconnect. If DCD still asserted sound warning.

RX Quit

Restore all datafile settings to initial state.
RXGet Cmd
Commences waiting states for "COLLECT" "DELIVER" "LOGOFF" "LOGIN" "PICKUP" "TRANSMIT"
Sends "Command?"
Timeout and line drop detection applies
Changes to RX Misc

RX Misc

Sends "Command?" 3 times. If none of Waiting states satisfied by timeout expiry changes to RX Reject.

Depending on what string first received changes to corresponding Allow collect, Accept Deliver, Goodbye, Answer Call, Allow Collect, Accept Deliver respectively. (The duplication is because, for testing purposes in implementation a manual mode is available for "COLLECT" and "DELIVER" being used but the full SFTI under the invention as described only relates to "PICKUP" and "TRANSMIT")

RX Password

On receipt of LIX Code checks to see if a collection mailbox exists by the name of the LIX Code, if so, and if local datafile specifies associated password, prompts for "password".

Verifies any password and, if verified records, sends and displays "Mailbox selected".

If password not verified re-prompt as above 3 times, timeout and line drop detection applies. If fail change to RX Reject.

RX Allow Collect

Checks if mailbox is there, if there, checks if any files contained in it changes to Sendfile or No More files respectively.

RX No More Files

Sends Message "There are no more files to collect" resets markers on files in collection mailbox if datafile parameter specifies not a once only collection mailbox.

RX Sendfile

Delay 1 second
Send "Get Ready to Receive <Filename>"
Delay 3 seconds
Display "Sending file to a caller"
Watches for "READY" or "RETRY"
Sends "SENDING FILE <Filename>SIZE<byte length in string of ASCII characters as numbers>" and optionally file transfer protocol code designator defining file transfer protocol to be used.

Loops waiting for remote to send "READY" or "RETRY" and optionally preferred file transfer protocol code if not same. All implementations of file transfer protocols are adapted not to support any direct manipulation of local operating system functions other than contemplated by the SFTI's operations here described.

Timeout and line drop detection apply.

If Timer expires, send "RETRY", increment timeout counter unless already 3 ( or if file transfer protocol remote request not supported), in which case go to fail state.

If receives "READY" attempts file transfer with original file transfer protocol or remote preferred one (if selection supported).

After File transfer protocol reports successful completion (if unsuccessful retry up to and including 3 times) loop waiting for "FAILED" "RESEND" "SUCCEEDED". If failed or resend received retry up to and including 3 times, (remote resuming file at point left off if possible).

If "Succeeded" received within timeout constraints then record and display "Receipt acknowledged" and bytes number, mark file as sent (so that no attempt made to resend in same session).

If timeout change to fail state for this state box.

RX Checkmore

Checks if any more files in mailbox, if so changes to Send File, if not, to Allow Collect

RX Accept Delivery

Sends "What is the addressee's code?"
Waits to receive (terminated by a line feed/carriage return pair) the addressee's name.

Manipulation of name may be made to make conform, with minimum change possible, to naming conventions of SFTI host environment.

Timeout and line drop detection apply. Reports on timeout up to and including 3 times.

Tries to create logical mailbox area. If not possible fails with sending "Sorry software problem at this end" and changes to fail state.

Records "Receiving file addressed to <name of mailbox>" displays similar message.

RX Receive File

Watches for "SENDING FILE <filename> SIZE <bytes> [optional file protocol designator]"

If received SENDS "READY" or, optionally, preferred file protocol designator.

If timeout expired, send "RETRY" until 3 retries made.

On receiving SENDING FILE etc. starts File protocol download (in appropriate file protocol, if any option).

When file protocol completes successfully makes independent check of bytes size of file received through local operating system and compares with stored size sent by remote. If compares OK sends "SUCCEEDED", otherwise "resend", or (after 4 retries) "FAILED".

Preferred implementation of File transfer protocol will resume file transfer on retry from point reached before prior failure in file transfer.

Records and displays on success in transfer log with bytes size of file.

Changes state to RX Misc if succeeded or RX Quit if all failed.

RX Goodbye

Sends "Goodbye from SFTI" drops DTR for sufficient period to persuade communications device to disconnect and sends high level command to same to disconnect and "go on hook". Records Session ends.

Changes to RX Quit

Note in RX and TX Mode all sent characters including passwords not case sensitive.

TX MODE (FIG. 6)

WAIT COMMAND

If receives string 'Command?' goes to do action.
If not within Timeout records Timer expired waiting for command prompt
Send Abort

DO DOWNLOADS

```
Watching for Do Action setup
"Get Ready" -> TX download
No more files -> Wait command
Timeout      ]
             ] -> TX send Abort
Carrier Drop ]
```

DOWNLOAD

Displays 'Receiving a file please do not interrupt '
Full SFTI goes into Send/Receive handshake (see TX)
If received correctly:
Displays "Records Received File <name> bytes"
Otherwise "Error Receiving"
Clear watches
Watches for "Get Ready to Receive"
"No More Files"
Do Downloads

DO ACTION

Processes Action file reads in a line at a time
Sends strings
"CALL"
"LOGIN"
"COLLECT"
"DELIVER"
"END ACTION"
Serves all action files except save "DELIVERS" to permit resumption and preserve state machine nature
Resume state

CALL

TX dial
Instructs modem to dial relevant
Watch for LIX Code
Dial fails attempt to dial 3 times (may be stopped by user
If dial succeeds
DCD is asserted or modem sends "CONNECT"

START LOGON

If received "LIX Code?"
Will display "Connected to <remote>"
Transfer log
Wait for "PASSWORD?", "COMMAND", "NOT RECOGNISED", "NO MAILBOX"(mixed case)
Sends "LIX POINT NO"
Starts Timer
TX check logon
If timer expires (205)
Display "Unable to make connection, will call later"
Transfer log

TX CHECK LOGON

If receives "Not Recognised"
Displays "Code and local LIX POINT No not recognised"
Transfer "Code and local LIX POINT No not recognised"
Wait "COMMAND"
Receives "NO MAILBOX"
Displays "Remote mailbox does not exist"
Transfer
Receives "PASSWORD?"
Clears all watches
Watch for "COMMAND" and "NOT RECOGNISED"
Sends <password>
States times
Goes to state

TX CHECK PASSWORD

Receives "COMMAND?"
Goes to TX Do Action ( to read next mailbox)
(If timer expires goes to TX Abort and records "Timer expired while waiting for prompt")

TX CHECK PASSWORD

Receives "NOT RECOGNISED"
Records "PASSWORD NOT RECOGNISED"
Adds line to action file to say when filed
Disables collection and goes to wait Command
If receives "COMMAND?"
Goes to Do Action If timer expires—records timer expired waiting for passworth confirmation
Goes to Send Abort

LOGIN—in Do Action

LOGIN sent
Records selecting mailbox for collection
Start LOGON

COLLECT

Creates Mailbox to receive information
If not records and displays "Could not create Mailbox—fail line in Action file"
TX send Abort
Watches "Get ready to receive", "No more files"
Full SFTI—sends pick up
TX Do Downloads

DELIVER

Check file exists
If not records "Could not find" but does not add to Action file
TX send Abort
Displays "Preparing to send file"
Changes to "TX Send Document"

END ACTION

If Action has failed will attempt to requeue action (insofar as not failed)
Unless action failed 3 times
LOGOFF

SEND DOCUMENTS

Full SFTI
Displays "TRANSMIT"
Waits for "CODE?"
Timeout—send Abort saves current action records "Timer expired waiting for Code"
Parties addressees code
Sends file
Recording "Sending file <name> bytes"—fail—
"Document Transfer Failed" saves action to be redone and records fail
Sends using Send/Receive part—Code for succeed
If gets success records "Receipt Acknowledged"
Deletes file if need be

SEND ABORT

Flushes action file, increments number of attempts unless 3
(Transfer failed 3 times—fails action)
Queues it again
Document transfer abandoned

TX QUIT

Same as RXQUIT turns on auto-answer

---

TX LOGOFF
Raises LOGOFF
Waits 3 seconds
Drops line
TXQUIT
Countdown between dials
User interrupt
Enabling calls

---

It should be appreciated that, together with the compression, data encryption (for example using public or private key encryption systems) could be used to provide a totally secure file transmission system where files are accessible only to the user with the correct key.

2. GETTING STARTED

In this section reference is made to setting up the LIX program correctly. If you had LIX installed for you your Setup should be correct, although you may wish to change it from time to time (see Section 9).

Running LIX from DOS

Unless your computer has been set up to run LIX automatically from a menu or when you first switch on the computer, you will need to start it by typing commands in DOS. This requires you first to change into the directory where LIX is installed (assuming you are on the same drive). Skip this stage if you are not running from DOS.

1. Type:
    cd [Directory in which LIX is installed e.g. ODYSSEY)
    <ENTER>
2. Type:
    lix3 <ENTER>[4]

[4] These tow lines (without <ENTER>) can be inserted in the AUTOEXEC.BAT file of your computer. If you wish to automate the running of LIX for the future.

After a while messages will appear on the bottom line of the screen and then LIX main menu will be displayed (if not please refer to the section on Troubleshooting), see next page.

LIX Main Menu

When you run LIX the main menu should appear, looking something like (depending on you preference for the type of menus displayed by LIX):

Enter Send/Receive Mode
Prepare a Transfer
Manage Incoming Mail
Convert Document Format
Use your Word Processor
Search LEXIS
Access Legal Teleforum
Options
Use Utilities: (Log . . . )
Setup (View/Alter)
eXit LIX Program If you have not subscribed to Legal Teleforum, then the Access Legal Teleforum in the Main Menu will not be effective. if you wish to subscribe, please contact LIX Limited.

Moving Around the Menus

The highlight bar will initially be on the first entry (ENTER SEND/RECEIVE MODE). You can move the bar up and down by using the <UP> and <DOWN> arrow keys. Select a given entry from the menu by pressing <ENTER> when the bar is on the menu entry you want; or simply look for the highlit letter in the line you wish to select and press the corresponding key.

Pressing the ESC key at any menu, and at many LIX prompts, will cancel the current action and return you to the previous menu. LIX Is intended to be usable without much reference to a manual, as almost all operations are carried out by selecting from a menu or fully explained prompt.

Probably the best way to get to know LIX is to explore at will, using Section 3 to help you to start with. But before you do that, you may find the following pages will help to familiarise you with the LIX screens and the information that they provide about the operation of the program.

SCREEN LAYOUT

Apart from the main Menu located in the top left hand corner of the screen, information or Instruction on how to proceed is provided in the line at the foot or the screen, e.g.: To select use cursor keys and RETURN/ENTER or select the highlit letter.

This line will alter to offer help on the particular part of the LIX program you are currently using.

The figure shown at the end of the help line (i.e. in the bottom right hand corner of the screen) is the amount of free space there is available on the hard disk of your computer, in thousands of bytes[5].

[5]bytes is a word explained in the glossary to this manual

The Transfer(s) Queued Message

In the top right hand corner of the screen appear the words 0 transfer(s) queued This simply tells you how many direct transfers of documents are waiting to be carried out by LIX. LIX allows you to set up a number of transfers and puts them in a queue until you are ready for LIX to carry them out. If a direct transfer is not carried out after three attempts a message:

1 failed will appear below the transfers queued message (on the second line of the screen).

Direct transfers (i.e. from you PC running LIX direct to the recipients LIX PC running LIX) can only be carried out if both computers are in LIX's Send/Receive mode (reached from the first entry on the Main Menu).

LIX Send/Receive Mode

Just as a fax Is ready to receive at any time when you are not using it, LIX will (unless you disable this feature) automatically "fall back" into Receive Mode from almost anywhere in the menus of LIX. This can be seen if you select the menu item "P" (Prepare a Transfer) from the main menu and then wait until the menu automatically disappears and then a while more and the main menu will disappear and, after various messages in the bottom line of the screen, it reads:

Ready to receive a call press any key to return to main menu

If LIX has "fallen back" into receive mode it will not start to make any transfers that are queued waiting to go out. To start any queued transfers off you must select "E" (Enter Send/Receive Mode) from the main menu, and LIX will then send attempt to send any queued transfers as well as receive.

Incoming Mailboxes

Unless you have received a LIX transfer, the right side of the LIX screen, below the top two lines and above the bottom line, will be blank, or "textured" when first started.

When you have received a LIX transfer an incoming mailbox will appear on the right side of the screen in dark (on a monochrome screen) or red text on white with a colour screen.

A heading will appear:

Incoming Mailbox(es)

with mailbox icon(s) beneath.

the name associated with each mailbox appears in the top line of each mailbox icon. You can look into a mailbox by selecting the Manage Incoming Mail item of the Main Menu.

Empty mailboxes are not shown.

Outgoing Mailboxes

As for incoming mailboxes, the left side of the LIX screen (mostly hidden by the LIX main menu while it is displayed) is used to show those mailboxes that have been set up on your machine for others to call in and collect document from.

They appear under the heading:
Outgoing Mailbox(es)

If there are none left, the left side of the LIX screen beneath the main menu will be blank or "textured", with no heading.

The names of the mailbox icons beneath the heading are the names of the mailboxes one or more of which another LIX machine collecting documents from your LIX machine must give together with the password a associated with that mailbox (see Section 3, "Putting a Document for Collection" for detail on passwords).

Once the contents of an outgoing mailbox have been collected, the outgoing icon for that mailbox will disappear from the LIX screen. This gives you an easy way of checking whether or not someone has collected documents from your LIX machine.

Installation

Installation will generally have been carried out for you by LIX Limited's sub-contractor. If you wish to make changes after installation, select Setup (View-/Alter) from the LIX main menu and follow the procedures in Section 9.

LIX Point Directory

When LIX Is installed an electronic copy of the most up to date directory of other LIX users' numbers is included. You can view this directory and select a recipient while you are preparing a transfer. Your LIX Point Directory can be updated electronically by arrangement with LIX Ltd.

Private Directory

You can also create your own private directory, which can contain the details of LIX users you most frequently communicate with, or users of "Satellite LIX" copies you have issued.

To edit the private dialling directory, press U for USE Utilities, and P for Edit Private Directory.

When you view the LIX Point dialling directory, private dialling directory entries are always listed first by LIX (see Prepare a transfer in the next Section).

3. QUICK GUIDE TO TRANSFERRING DOCUMENTS

Transferring documents using LIX, whether sending or collecting is similar to preparing a fax. There are 3 stages or stages:

1. Writing out a fax front sheet and selecting the document(s) you want to send;
2. Writing any covering message on the fax;
3. Sending.

LIX keeps to the same 3 simple stages, although there are some facilities you would not find on a fax!

---

SENDING

STEP 1
From the lix Main menu:

| Press | For action: |
|---|---|
| P | Prepare a Transfer |
| S | Send a Document |
| Type in | addressee's LIX point (e.g. LON002) |
| or <ENTER> | for a list of LIX Points (PgDn/Pgup for more) Recipient's preferred WP Type: LIX may report the recipient's preferred WP type. If this is not the same as yours and you have Conversion facilities it would be a courtesy to convert the documents before sending! Press ESC to return to menus - see Section 4 on Converting Documents. |
| Type in | addressee's name or initials (maximum 8 characters) |
| Type in | name or initials of sender (maximum 8 characters |
| Type in | name of the document(s) to be sent (repeat as necessary) |
| or type in | the name of the [6]directory (and any mask) you want to look for the document in (e.g.\ WP \*.DOC); |
| and/or <ENTER> | to select a document from the picker. |

STEP 2
| Answer | to the questions: Add a covering message? |
|---|---|
| Yes | Especially if you are sending to someone who will need to change the Wordprocessor format of any document you are sending, but also a covering message or "front sheet" can give the full names of the addressee and sender and any other covering details. (Press ESC to exit, confirm Y to save and ESC again) Compress Documents? |
| Yes | to save telephone costs, and required if you want to encrypt the documents you are sending. Encrypt Documents? |
| No | unless you are sure the recipient will know the encryption key you use [7]Send via Legal Teleforum? |
| No | unless you want to send to the recipient indirectly, for the recipient to retrieve next time they access Legal Teleforum. Collect Documents from <LIX Point>? |
| No | unless you have a collection to make from the same LIX Point (and know the name of the mailbox to collect from and the password of the mailbox) |

STEP 3
At this point LIX will return to the "Specify Transfer" menu, and will display ja summary of the transfer just prepared, which will automatically disappear after a short while, or on your pressing any key.

| Press | for action: |
|---|---|
| R | Return to Main Menu (from "Specify Transfer" menu) |
| E | Enter Send/receive mode |
| Type in | the time[8] you wish transfers from your LIX machine to start (it will receive all calls at any time). If you do not want to delay transfers do not change the time. |
| - and - | |
| <ENTER> | to confirm time to begin transfers (ESC returns to Main menu). |

[6]all italicised words are explained in the glossary of this manual
[7]this option only appears if you and the recipient are a Teleforum subscriber
[8]NOTE: the time must be entered as on a 24 hour clock (e.g. 18:10 for 6.10 p.m.) the colon between the numbers is required.

RECEIVING DOCUMENTS

Whenever LIX is in Send/receive mode (or has "fallen back" automatically into Receive only mode) LIX will receive transfers of documents from other LIX machines without any intervention from you.

The right hand half of the LIX screen shows receipt of any incoming transfers by displaying mailboxes icons with the names of the intended recipient. A mailbox may contain one or more envelopes. An envelope may contain one or more documents.

When a transfer has been received you will want to find out what it is and who it should be passed on to.

Managing Incoming Mail to do this from the LIX Main Menu (you need to press a first key to call up the Main Menu if LIX is in receive mode)

| Press | for action: |
|---|---|
| M | Manage Incoming Mail |
| | The following prompt will appear |
| | Take documents from: |
| | and next to it a menu headed: Select which mailbox |
| | Use the cursor keys to move the highlight bar up and down the list and press ENTER to select one. |
| | The following prompt will appear |
| | Select envelope |
| | and next to it a list of the envelopes in that mailbox |
| | Use the cursor keys to move the highlight bar up and down the list and press ENTER to select one. |
| | A menu will appear after a pause while LIX opens the envelope something like this: |
| | View/Print Covering Message |
| | List Documents Enclosed |
| | Transfer All Documents to ... |
| | Discard Envelope |
| | Return to Previous menu |
| | The first item (View/Print Covering Message) will not appear if LIX cannot find a covering message in the selected envelope. |
| Press | for action: |
| V | To view covering message (if present) |
| | Press the CTRL and K keys together followed by the P key to print the message |
| L | To display list of documents in the envelope |
| | Press the CTRL and K keys together followed by the P key to print the message |
| T | To Transfer empty the envelope into a directory on either your hard disk or a diskette. |
| | Transferring documents from an envelope |
| | When you select this it item you will be prompted with a choice of which directory the documents in the envelope, and the covering message are to be transferred to: |
| | WP Directory — according to LIX's Setup |
| | Conversion Directory — for documents that need conversion |
| | Other Directory for you to specify where to |
| D | To discard the envelope and all its contents. |

PUTTING A DOCUMENT FOR COLLECTION

LIX allows you to "put documents for collection" by another LIX user, useful if perhaps the other user is working away from the office on a portable machine, or is a client whom you do not want to incur telephone charges.

LIX can only carry out a collection if the machine from which collection is being made is in Receive Mode with the desired Collection Mailbox already setup at the time when the collecting LIX machine calls to make the collection.

As with sending documents, LIX treats setting up document(s) for collection in 3 easy stages like preparing a fax. See next page.

PUTTING A DOCUMENT FOR COLLECTION

| STEP 1 | From the Main menu or LIX: |
|---|---|
| Press | for action: |
| P | Prepare a Transfer |
| P | Put a Document for collection |
| Select | New name if an outgoing mailbox with the right name does not exist. |
| OR Select | Existing outgoing mailbox (and skip next two actions) |
| Type in | the name or an outgoing mailbox to put the documents in. New mailbox names have up to 8 characters. |
| Type in | the password to be given by the caller for access to this mailbox (no spaces are allowed in passwords). |
| C or R | "collection only" (C): means a caller may only collect documents from the mailbox. "Receive and collect" (R): is a little advanced and not often needed, it means that documents received into an incoming mailbox with the same name may also be collected from this mailbox. |
| type in | the name of the document(s) to be sent (repeat as necessary); |
| or type in | the name of the [9]directory (and any mask) you want to look for the document in (e.g. \WP51\*.DOC); |
| and | to select a document from the picker. |
| <ENTER> | |
| STEP 2 | |
| Answer | to the questions: |
| | Add a covering message? |
| Yes | Especially if the document(s) are being collected by someone who win need to change the Word-processor format of any document you are sending, but also a covering message or "front sheet" can give the full names of the addressee and sender and any other covering details. (Press ESC to exit, confirm Y to save covering message and ESC again) |
| | Compress Documents? |
| Yes | to save telephone costs, and required if you want to you are sending. |
| | Encrypt Documents? |
| No | unless you are sure the recipient will know the encryption key you use. |
| STEP 3 | |

LIX will return to the Specify Transfer menu once Step 2 is complete.
To make LIX ready for the documents in the mailbox to be collected:

| Press | for action: |
|---|---|
| R | Return to Main Menu (or ESC) |
| E | Enter Send/receive mode |
| Type in | the time[10] you wish transfers from your LIX machine to start (it will receive all calls at any time). If you do not want to delay transfers do not change the time. |
| -and- <ENTER> | to confirm time to begin transfers (ESC returns to Main menu). |

[9]all italicised words are explained in the glossary of this manual
[10]NOTE: the time must be entered as on a 24 hour clock (e.g. 18:10 for 6.10 p.m.). the colon between the numbers is required.

COLLECTING DOCUMENTS FROM ANOTHER LIX MACHINE

LIX allows you to collect documents from another LIX machine, provided you have given correct details of the mailbox and its password on the other LIX machine that you want to collect from.

| STEP 1 | From the Main Menu of LIX. |
|---|---|
| Press | for Action |
| P | Prepare a transfer |
| C | Collect a document |

| | |
|---|---|
| Type in or <ENTER> | LIX Point from which to collect documents. for a list of LIX Points, from which you can select using the cursor keys and <ENTER> (PgDn to see more entries). |
| Type in | name of mailbox you want to collect from (you need to get this from the person who has set up the mailbox on the other LIX machine) |
| Type in | the password for that mailbox (you need to get this from the person who has set up the mailbox on the other LIX machine) |
| N | not to collect from another named mailbox (as the case may be) |

COLLECTING DOCUMENTS FROM ANOTHER LIX MACHINE

STEP 2

LIX will return to the Specify Transfer menu once step 1 is complete.

The "Transfers Queued" figure in the top right of the LIX screen should increase by one. If you want to specify another document transfer, select the appropriate item from this menu. If not:

| Press | for action: |
|---|---|
| R | Return to Main menu (or ESC) |
| E | Enter Send/receive mode |
| Type in | the time[11] you wish transfers from your LIX machine to start (it will receive all calls at any time). If you do not want to delay transfers do not change the time. |

[11]NOTE: the time must be entered as on a 24 hour clock (e.g. 18:10 for 6.10 p.m.), the colon between the numbers is required.

COLLECTING DOCUMENTS FROM ANOTHER LIX MACHINE

STEP 3

An incoming mailbox will be shown on the right hand side of your screen. Step 3 involves the process of managing the contents of an incoming mailbox—see Manage Incoming Mail for how to deal with incoming mailbox.

TRANSFER LOG

All transfers of documents, whether successful or unsuccessful are recorded in TRANSFER LOGS kept by both LIX machines.

To view the Transfer Log make sure your printer is switched on and attached to your computer first, select U for Use Utilities and T for Transfer Log (View/Print).

To print the log, press the Ctrl key and the K key together followed by the P key.

Referring to FIG. 7b, a description of the transfer log entries indicated by the reference numerals therein is as follows:

1) All transfer logs are kept monthly—new log new month. In use LIX inhibits editing of the transfer log by use of DOS ATTRIB.COM program.

1A) Typical log produced by automatic dial attempt which did not connect.

2) Example of uniquely coded "envelope" in compressed/preprocessed form being sent. Files can also be sent individually in uncompressed form and LIX will resume transfer at last file not successfully sent if failure occurs, not at beginning of list.

3) The transfer log records the names of all files contained in a compressed 'envelope' at the time the 'envelope' file is created. To assist in tracking what was sent in what envelopes, it would e possible to reproduce the integrity check information incidentally generated (typically CRC—cyclical redundancy check and check sum) during compression too, to provide high degree of backward auditability as the file(s) contained could then be separately be re-integrity checked to demonstrate that they were identical to the ones enclosed in the envelope.

4) Example of record made of remote acknowledgement from remote operating system.

5) And received.

Referring to FIG. 7b, a description of the transfer log entries indicated by the reference numerals therein is as follows:

1) All transfer logs are kept monthly—new log new month. Old logs are kept indefinitely. In use LIX inhibits editing of the transfer log by use of DOS ATTRIB.-COM program.

1A) Typical log produced by automatic dial attempt which did not connect.

2) Example of uniquely coded "envelope" in compressed/preprocessed form being sent. Files can also be sent individually in uncompressed form and LIX will resume transfer at last file not successfully sent if failure occurs, not at beginning of list.

3) the transfer log records the names of all files contained in a compressed 'envelope' at the time the 'envelope' file is created. To assist in tracking what was sent in what envelopes, it would be possible to reproduce the integrity check information incidentally generated (typically CRC—cyclical redundance check and check sum) during compression too, to provide high degree of backward auditability as the file(s) contained could then be separately be re-integrity checked to demonstrate that they were identical to the ones enclosed in the envelope.

4) Example of record made of remote acknowledgement from remote operating system.

5) And received.

"CURRENT ACTIVITY"

The number of direct transfers pending is shown on the top right of the screen. The next one to be executed (the "current activity") is shown momentarily below the Specify Transfer screen, each time it appears. You can cut short the display of the Current Activity by pressing any key.

MANAGING THE TRANSACTION QUEUES

If a transfer you have specified has failed after LIX has tried to make the transfer (send or collect) and it fails, LIX puts that transfer to the bottom of a queue. When the transfer has failed a number of times, LIX puts the details of that transfer in the Failed Transaction queue.

Until a transfer has been completed, or been failed by LIX, it is held In the Direct Transaction queue. LIX will allow a transfer to stay in the queue until it has reached the limit a retries allowed (3). Similarly transfers directed via Legal Teleforum are held in a queue until completed.

You can manage the entries in these queues if you want to override LIX's use of them.

From the Main Menu, press U for Use Utilities and Q for Manage Transaction Queue.

Direct transfers in the queue may be cancelled (an put in the failed transaction queue in case you want to retry later), press D for Cancel Direct Transaction and then pick the transfer cancel.

Teleforum transfers can be cancelled (but no failed queue exists for Legal Teleforum transactions), press T and pick the transfer to cancel.

A failed transaction may be discarded, press F for Discard Failed Transaction and then pick the transfer to be discarded.

Failed transactions can be retried, press R for Retry Failed Transaction.

4. DOCUMENT CONVERSION

Introduction

As an option with LIX (which LIX Ltd supplied) you can purchase a commercially available document conversion program[12], use of which has been closely integrated to simplify as much as possible converting documents received or to be sent via LIX.

[12]Software Bridge Version 4.1 required. Copyright Systems Compatibility Corp. Inc.

LIX offers a Quick Conversion facility which takes a lot of the "complexity" out of converting documents by supplying a lot of assumptions for you. Alternatively you can access from within LIX the full conversion facilities offered by the conversion program.

WHICH CONVERSION FACILITY TO USE?

If you had Software Bridge when LIX was installed, your LIX software may have been "told" what your preferred WP format is for your own documents. If this has been correctly set then it saves you having to select your WP format every time you convert.

Quick conversion under LIX uses the setup information (which you can change through LIX's Setup Program, see Section 9). So LIX will not ask you what your own WP is. All you need to know is the format you are converting from or to (i.e. what the format before conversion is for an incoming document or after conversion is for an outgoing document).

If you don't know the format of an incoming document use Full Conversion facilities as these can autodetect a number of formats. Refer to your Software Bridge Manual for details.

Directories

Incoming documents which need to be converted for your Wordprocessor, or which you are unsure about, should be transferred into in the conversion directory.

LIX will tell you, as you set up a transfer to send documents, what the preferred WP type of the recipient is. You can convert the document(s) before sending if you have the conversion facilities available.

A document in your wordprocessor which you want to convert before sending should preferably be in your word-processing documents directory and then converted Into the conversion directory. Once you have converted it you can send the converted document from the conversion directory.

Quick Conversion From Conversion Directory—STEP 1

| Press for | From the LIX Main Menu: action: |
|---|---|
| C | Convert Document Format |
| Q | Quick Convert |
| C | From Conversion Directory |
| Type in or type in | the name of the document to be converted; the name of the [13]directory (and any mask) you want to look for the document in (e.g. \WP51\*. DOC); |
| and/or <ENTER> | to select a document from the picker. |

[13]all italicised words are explained in the glossary.

Quick Conversion From Conversion Directory—Step 2

Having selected the document you want to convert under Step 1, LIX displays a menu filling half the screen with the available WP formats that can be converted.

Use Cursor Keys

To "point" to the WP format that the document you want to convert is in now (LIX "knows" what your preferred WP is according to its Setup information)

Existing Document?

If LIX detects that there is already a document In your WP directory with a name that would match the name of the document after conversion, LIX will prompt you asking whether you want to overwrite it. Answer "No" to alter the name. ESC cancels the conversion process.

Accept/Respecify

LIX will then prompt you to confirm you are happy with the document selected and the name it has generated for the—converted document (and the directory into which it will put the converted document). You can respecify the directory and name if you wish to.

During conversion, the screen clears and displays the message:

Please wait. Conversion in progress.

When conversion has taken place, LIX will tell you whether conversion appears to have been successful or not. You are then returned to the LIX Main Menu.

Problem in Conversion?

If LIX is unable to convert using Quick Convert, a message will report this.

In this case use Full conversion Facilities from the Convert a Document item on the LIX Main Menu.

Once successful conversion of an incoming document has taken place (i.e. conversion into your own WP format), you can immediately view the converted file by entering your word-processor, from the LIX Main Menu select:

| W | Use your Word Processor |
|---|---|

The converted document should be displayed by your word-processor immediately, assuming that your LIX program has been set up correctly.

Quick Conversion From WP Directory STEP 1

If you want to convert a document before sending to another LIX user who has a different WP Type:

| Press | For Action: |
|---|---|
| C | For Convert Document Format |
| Q | For Quick Conversion |
| W | From WP Directory |
| Type in or type in | the name of the document to be converted name of the [14]directory (and mask) you wish |

-continued to look for the document in;
and/or <ENTER> to select a document from the picker

[14]italicised words are explained in the glossary.

Quick Conversion From WP Directory—STEP 2

LIX will prompt you with the name it has generated for the document after conversion. Accept or respecify as appropriate, ESC cancels the conversion process.

When you have accepted the converted name for the document, LIX will prompt you for the format the document is to be converted into.

LIX displays a men filling half the screen with the available WP formats that can be converted.

Use Cursor Keys

To "point" to the WP format that the document have selected is in now (LIX "knows" what your preferred WP is according to its Setup information)

FULL CONVERSION FACILITY

Selection of this option from the Convert Document sub-menu causes the full Software Bridge program to be run. This program has extensive context sensitive Help facilities.

Please refer to your Software Bridge manual for more information on the operation of Software Bridge.

The first screen of Software Bridge gives you two options, namely:
Press 1 Translate from FORMAT A into FORMAT B or
Press 3 Alter the setup (and the conversions)
(if A is not "Autotranslate" there will be an option 2, which is just translating from Format B to Format A)

You should select Autotranslate for FORMAT A, as the package will identify the correct WP format of any incoming document. FORMAT B is the destination WP format, i.e. the format into which you wish the document to be converted.

There are extensive features in the Alter Setup facility, enabling you to select a directory, through which to scroll and select documents for conversion, and to set up multiple queues of documents to be converted. You may also specify the precise way in which the output documents are to be named and located.

Press 4 to return to LIX.

5. USING YOUR WORD PROCESSOR

IF LIX has been correctly setup, you can run your word-processing program, starting in your "documents" directory.

The set-up of your word processor within LIX may be altered or viewed in the LIX Setup Program (see Section 9):
From the LIX Main Menu:

| Press | for action: |
|---|---|
| W | Use your Word Processor |

RETURNING TO LIX AFTER WORD-PROCESSING

If you ran your word processor from the LIX Main Menu, then you will be returned automatically to LIX when you leave your word processor. Otherwise you will need to restart LIX—see Getting Started (see Section 2).

8. UTILITIES

LIX has a number of Utilities to help with operating LIX. From the Main Menu press

| U | Use Utilities (Log . . . |
|---|---|

This gives the UTILITIES screen
View/Print Transfer Log
Manage Transaction Queue
Use LIX Internal Editor
Drop into mini DOS Shell
Edit Configuration Files
Edit Private Directory
Clear Outgoing Mailbox
Remote Diagnostic Mode
Return to Main Menu
Each of these important utility functions will be dealt with in turn.

Viewing and Printing the Transfer Log

From the Utilities menu press

| T | View/Print Transfer Log |
|---|---|

This will produce a half screen listing of the current transfer log. The name of the file will be TRANSFER-.<mon>, where <mon> represents the first three letters of the current month, e.g.
C:\ODYSSEY\TRANSFER.JAN If you get a whole screen listing, you can toggle to the half screen and back again using the F5 key. The pgDn key moves you down through the log, PgUp up.

An example of the entries in the transfer log follow:

| | | |
|---|---|---|
| 01-Jan-1991 | 12:02:12 | **Start of new month log |
| 01-Jan-1991 | 13:45:35 | **Got call from - LON004 |
| 01-Jan-1991 | 13:45:38 | **Receiving file addressed to sean |
| 01-Jan-1991 | 13:46:21 | **Document BBSILKS.MEM or 9995 bytes received successfully |
| 01-Jan-1991 | 13:46:45 | **The following files have been bundled into file "RECD0004.ZIP" |
| 01-Jan-1991 | 13:46:45 | **in mailbox SEAN |
| 01-Jan-1991 | 13:46:45 | **START OF LIST |
| 01-Jan-1991 | 13:46:45 | **C:\ODYSSEY\HOLD\SEAN\BBSILKS.MEM |
| 01-Jan-1991 | 13:46:45 | **END OF LIST |
| 01-Jan-1991 | 13:46:47 | **Session completed. |
| 01-Jan-1991 | 18:15:12 | **Dialling lon002 LIX Ltd |
| 01-Jan-1991 | 18:15:51 | **Document transfer abandoned. |
| 01-Jan-1991 | 18:15:54 | **Session completed. |

The entries at 13:45 and 13:46 show a successful receipt of a direct transfer of a file called BBSILKS.-MEM of length 9995 bytes, which was placed into an incoming mailbox called Sean. The sender was LON004. The document was placed in an envelope called PECD0004.zip before being placed into the mailbox.

The entries at 18:15 show what is recorded when a transfer fails.

To print out the list, press Ctrl-K P. Check the printer is online and switched on first. To print out part only of a list, first move the cursor to the beginning of the first line and press function key F7, then move the cursor to the end of the last line and press function key F8. Finally press Ctrl-K P.

The transfer log Is Read Only, so that you are not able to alter it. It therefore is a permanent record of the transfers made to and from your computer. Any remote LIX computer with which you have been in communication will have a corresponding transfer log. You may wish to back up your transfer logs from time to time by copying them to floppy disk, see below about how transfer logs are archived.

It is important that you ensure that your computer's internal clock is keeping good time, or entries in the Transfer log will be inaccurate.

TO RESET THE INTERNAL CLOCK

If your computer's internal clock is wrong, normally you may reset the time from the DOS root prompt, which you can access from the LIX Main Menu as follows:

|      | Press          | U for Utilities                |
|------|----------------|--------------------------------|
|      | Press          | D for Drop into mini DOS Shell |
| Type | cd \ <ENTER>   |                                |
|      | Type           | time <ENTER>                   |

Then type the required correct time (in 24 hour format), with a colon between the hours and minutes, followed by <ENTER>

| Type  | EXIT <ENTER>                |
|-------|-----------------------------|
| Press | R to Return to the Main Menu. |

Archiving the Transfer Log Monthly

At the beginning of each month LIX opens a new Transfer log and renames any preceding month's transfer log ready for it to be archived.

any previously archived monthly log may be viewed from the Internal Message Editor.

From the LIX Main Menu:

| U          | Use Utilities (Log . . . |
|------------|--------------------------|
| I          | Use LIX Internal Editor  |
| Then press: |                         |
| F3         |                          |

Finally, type:
\*.TRF <ENTER>
This will display a list of all the previously archived monthly files. (Ignore any entry beginning with a diamond). Move your cursor until the desired monthly log Is highlighted and press <ENTER>. The log of that month will then be displayed.

You may print out the whole log using Ctrol-K P or part of it by first highlighting the relevant passage (pressing F7 and the beginning and F8 after the end) before using Ctrl-K P. Ensure your printer is attached and switched on first.

To leave the log, press ESC and then R to return to the LIX Main Menu.

Managing the Queue of Transfers

Until transfers of documents have been completed, they are all pending, and are queued. LIX allows you to control these queues.

There are two queues kept by LIX in respect of direct transfers (untried transfers and failed transfers), and one in respect of Indirect—Teleforum—transfers (untried and/or unsuccessful).

The number shown on the top right hand corner of the screen is the number of untried direct transfers. A list of failed direct transfers appear below the LIX Main Menu each time it is accessed.

You can manage the respective queues from the LIX main menu, by pressing:

| U | Use Utilities (Log . . .) |
|---|---------------------------|
|   | and then                  |
| Q | Manage Transaction Queue  |

This will produce the Manage Queue screen:
Cancel Direct Transaction
Cancel Teleforum Transaction
Retry Failed Transaction
Discard Failed Transaction
Return to Previous Menu

CANCELLING A TRANSFER

To cancel any one outstanding transfer (whether it is direct or indirect) press the relevant entry, i.e.

| D | Cancel Direct Transaction or       |
|---|------------------------------------|
| T | Cancel Legal Teleforum Transaction |

You will then be provided with a list of addressees of the currently queued transfers e.g.:
Deliver to: SOMEONE@LON002
Collect from LON001
Deliver to: Fred@LON003

Select which of these transfers you wish to cancel, using the cursor and the <ENTER> key. In order to ensure that the correct transaction is about to be cancelled (as you may have more than one transfer pending to the same addressee) you will then be sown precisely which documents are listed to be transferred to that addressee.

You may then finally confirm your choice of deletion. You will then be returned to the remaining list of transfers in the queue.

Press R to return to the previous menu, once you have completed all the necessary deletions.

FAILED DIRECT TRANSFER

If you leave your computer unattended in Send-/receive mode, LIX will attempt carry out all queued direct transfers, retrying each one up to three times. If a transfer fails all attempts, then LIX simply removes that transfer from the active queue, and continues with the next.

When you return to your computer you will immediately be able to see if any transfers has failed, as a message:

1 failed will appear below the "transfer(s) queued" message in the top right corner of the LIX screen. The number will record how many.

LIX will not retry a failed direct transfer automatically. You have to retry it by putting it back In the direct transfers. To do this, from the Manage Queue menu press:

| R | Retry Failed Transaction |
|---|---| and then select the transactions that you wish to retry.

CANCELLING FAILED DIRECT TRANSFERS

Should you decide not to proceed with any failed direct transfer, you may cancel it altogether. From the Manage Queue screen press:

| F | Discard Failed Transaction |
|---|---| and then select which transaction is to be removed altogether.

Using LIX Internal Editor

You may use the Internal Editor (which is the same as the one used for composing messages when using the Offline processor), from the LIX main menu, by pressing:

| U | Use Utilities (Log . . .) |
|---|---|
|   | and then |
| I | Use LIX Internal Editor. |

This creates a document called Message.ody, in the home directory of LIX (i.e. the one In which the LIX program is stored).

There are extensive commands available to the editor:

| | |
|---|---|
| F2 | To save the current document |
| F3 | To load another document, or create a fresh one, type in the name followed by <ENTER>. Alternatively type *.* to see a list of all documents in the currently displayed directory. If you wish to use a floppy disk, type A:\*.* or B:\*.*. You can hop up or down directories by selecting the diamonds with the cursor and pressing <ENTER>. Place the cursor over the desired document, when you have located it, and press <ENTER>. |
| F5 | To zoom from half to full size display, and back again. The size of the "half size display" may be altered with F10, and it may be repositioned with F9. |
| F1 | To get HELP. |

Move from the one screen to the next with <PageUp> and <PageDown> keys.

Edit from the HELP facility by pressing ESC.

MARKERS

| | |
|---|---|
| F7 | The beginning Marker or Ctrl-K B |
| F8 | The end Marker. or Ctrl-K K |

Text that is blocked by the markers may then be manipulated, moved printed etc.

| BLOCK COMMANDS | |
|---|---|
| Copy Ctrl-K C | |
| Move Ctrl-K V | |
| Delete Ctrl-K Y | |
| Print Ctrl-K P | (ensure Printer Is attached and turned on) |
| Write Ctrl-K W | Give the file name to write to |
| Read Ctrl-K R | Give the file name to read from |
| AppendCtrl-K A | Give the file name to append to |
| Start Ctrl-Q B | Find start of block |
| End Ctrl-Q K | Find end of block |
| OTHER USEFUL COMMANDS | |
| Delete | |
| Ctrl-T | Delete WORD |
| Ctrl-Y | Delete LINE |
| Search | |
| Ctrl-Q F | Find |
| Ctrl-Q A | Find and Replace |
| Ctrl-L | Repeat Last Find and Replace |
| Format | |
| Ctrl-B | Reformats paragraph from cursor onwards |
| Margin | |
| Ctrl-Q M | Set right margin to position of cursor |
| Shelling out to DOS | |
| Hop Into Mini DOS Shell. | |
| From the LIX Main Menu, press: | |
| U | Utilities (Log . . . then press: |
| D | Drop into mini DOS Shell |

You will then temporarily call the LIX program to the DOS prompt your screen will look something like:

Type EXIT to return to Odyssey
C:\ODYSSEY>

At this point you may now carry out many DOS commands, e.g.

DIR/W
copy *.doc A:

and so on. Do not attempt to run any larger programs from this "shelled out" position, as there will not be enough memory. You can then "drop back" to the LIX program, by typing:

EXIT <ENTER>

You should ignore the reference to Odyssey, which is part of the LIX software package.

On return to LIX, you will still be in the LIX Program Utility menu. To return to the LIX Main Menu, press:

| R | Return to Main Menu |
|---|---|

Altering Configuration Files

Edit Configuration Files
From the LIX Main Menu, press

| U | Use Utilities (Log . . .) |
|---|---|
|   | then press |
| E | Edit Configuration Files. |

You will be presented with the following sub-menu:
Password File
LIX Configuration File
Mail Aliases
Return to previous menu Essentially, the Password file contains passwords given to you by LIX Ltd, CIX and LEXIS. The LIX configuration file contains details specific to your word-processor and the location of certain files.

It will generally not be necessary for you to alter the contents of these two files using this Edit Configuration File route, since the same task can be achieved much more simply using the SETUP facility that you can access from the LIX Main Menu.

Should you need to alter either of these files directly, please remember that any incorrect addition or deletion of information in the files may prevent the correct execution of the LIX program. LIX relies on the format of these files and so changes to them are extremely sensitive. You should use the SETUP facility if you possibly can, to avoid errors occurring.

To display either file, select it and then press <ENTER>. If you make any changes, save them with P2, or abandon them using ESC.

Press R to Return to the previous menu.

Setting Mail Aliases

This is an advanced feature dealt with in Telepathy training.

Private Dialing Directory

From the LIX Main Menu, press

| | |
|---|---|
| U | Use Utilities (Log . . .) |
| | then press |
| P | Edit Private Directory |

You will then be presented with a list of all the existing Private Dialling entries that you have made. If you have made none, the only entry will say NEW ENTRY.

By moving the cursor over any entry (then pressing <ENTER>) you can edit it. To make a new entry move the cursor over NEW ENTRY and press <ENTER>.

The Editing box will ask you to enter the following information:

| | |
|---|---|
| Description | This should be up to 18 characters of information, which will enable you to recognise the entry at a later date. Only the first 18 characters are displayed in the LIX Point list |
| LIX telephone | This is the telephone number to which the other number party's computer is attached. It is not the "voice" number. |
| Voice telephone | Here enter the telephone number of the person who number will ensure that their LIX computer is switched on and in Send/receive mode, and who needs to be alerted that documents may be sent or collected. |
| Unique number | This Is your "private LIX point number", ie the number that you will use in the future to identify the new recipient in your own machine. The first three characters must be letters. The maximum length is 8 characters. E.G. CLIENTO1 OFFICE_1 etc |
| Legal Teleforum | This is the nickname (LIX ID) that the person has ID been allocated by Legal Teleforum. You should ensure that this information is correct, as incorrect entries may prevent satisfactory indirect transfers of documents to that person, as they will not be recognised by the Legal Teleforum computer. |
| CIX ID | As above. This is the nickname (CIX ID) that has been allocated to the person by |

-continued

| |
|---|
| CIX. |

Finally you will be asked if you wish to save the entry. If you answer YES the entries will appear in the Edit box, and also in the list of LIX point numbers when you are next in Prepare a Transfer. You may leave the Edit box by pressing ESC.

Private Dialling Directory entries can be deleted by highlighting an entry and striking the DEL key.

Clear Outgoing Mailbox

This refers to the Outgoing Mailboxes on the left hand side of the screen. To clear Incoming mailboxes (on the right had side) use the Manage Incoming Mall facility (M from the LIX Main Menu)

| | |
|---|---|
| U | Use Utilities (Log . . .) |
| | then press |
| O | Clear Outgoing Mailbox |

You will then be asked to select which outgoing mailbox to discard (assuming that there are one or more displayed). Indicate your choice by moving the highlight and pressing <ENTER>.

Finally you will be given a further chance of cancelling the request for the discard. If you answer YES to "Are you sure?" the contents of the outgoing mailbox will be permanently removed and the mailbox will no longer be capable of being emptied by other LIX users.

You can always refill an outgoing mailbox, by leaving documents for collection in it, using the Prepare a Transfer facility from the LIX Main Menu.

Press R to Return to the Main Menu.

Remote Diagnostic Mode

In the event of your experiencing problems with your LIX program, it is possible for LIX Ltd to access your computer directly, if it is switched into Remote Diagnostic Mode, in order to carry out tests, and to send you fixes for your problems.

Telephone LIX Ltd to set-up the diagnostic link, and then from the Main Menu, press:

| | |
|---|---|
| U | Use Utilities (Log . . .) |
| | followed by |
| M | Remote Diagnostic Mode |

You screen will then clear (except for some entries in the first few lines). At the foot of the screen you will see: Odyssey Host Mode: Waiting for Call: Press ESC to leave Host Mode Please remain in this condition until LIX Ltd have completed their diagnosis. Then press ESC to return to the LIX Main Menu

Return to Main Menu

Press R or ESC to Return from the Utilities sub-menu to the Main Menu

| | |
|---|---|
| Online ID | This is your Legal Teleforum nickname (LIX ID) |
| Online password | This is your Teleforum password. It is stored, but not displayed. If you choose not to store it, you will be prompted for your password, each time |

| | -continued |
|---|---|
| Offline password | you perform an automatic message exchange. It is assumed that your offline ID (ie the name you give to access your offline messages will be the same as you online ID. What is here required is the password that you have given the offline processor. Again, if this is not stored, you will be prompted each time you access the offline processor. |

There are corresponding entries for access to CIX and to the CIX offline messages.

Press R to return to the Setup Menu.

Remember to press S for Save and Exit, if you have made any changes that you wish to keep.

GLOSSARY

These are the terms used in this manual indicated by italics in the text:

bytes

This word is used by LIX in the Transfer Log when it records the precise length of a document it is sending. When the Receipt Acknowledged message appears this means that the receiving LIX machine has made an Independent verification of the length of the document just received in bytes and has agreed it tallies.

Why does LIX use this word?

A Byte means "a group of 8 bits". A bit is the basic unit of representing information in a computer (either 0 or 1).

To represent the character set (e.g. The letters a-z and Z-Z and the numbers 0-9) used by programs, such as wordprocessors, computers use large binary numbers (in 8 places) and each binary number in the range of all numbers with 8 places can relate to a particular character or alphabet letter.

When a wordprocessor program records a document onto magnetic disk all the bytes representing all the letters in the document are recorded.

Without going into great technical detail, it is often reasonably accurate to refer to the number of bytes as the number of letters in document.

Of course this can be wildly inaccurate if the document contains a lot of special formatting, fonts, typestyles, graphics etc.; common with modern wordprocessors. LIX opted not to refer to the length of documents in characters for this reason.

conferences

Conferences, more particularly text conferences, are like having a room where people who wish to discuss a subject but may never be all together at once can write messages on a blackboard, for all the others who use that room to read and comment upon by more messages on the blackboard.

In Legal Teleforum conferences can be set up by any subscriber and may be open, private or confidential. Messages in conferences to which you are joined can be retrieved automatically by LIX and the read in the offline reader program which is part of the LIX package, known as Telepathy.

Responses to messages in conferences can be prepared at your leisure in Telepathy without incurring use charges on Legal Teleforum, and then posted at speed automatically by LIX.

Text conferences on Legal Teleforum are known by a main conference name (e.g. "personal$_{13}$ injury$_{13}$ awards") and then within the conference there are any number of separate "topics" (which each correspond to the blackboard described).

conversion directory (see also directory below)

Only of use if you have the document conversion program optionally available with LIX from LIX Ltd.

As you may remove documents which are not in a format that your wordprocessor can read directly, LIX provides a directory where these documents can be transferred to (when they are taken out of the envelope in the mailbox to which they were addressed).

Similarly you may need to convert your own WP documents into another format prior to sending the converted document to another LIX user. The conversion directory is the place where LIX places such converted documents (LIX gives a document converted from your conversion directory the extension ".CNV").

directory

A directory is a word used in describing how you can organise documents and other electronic "files" held on a Personal Computer. ("Files" is term used to describe any type of electronic record held on a computer's magnetic disk, including programs, spreadsheet data files, wordprocessor files or documents etc.)

If all documents recorded on a computer's magnetic disk were not held in directories, trying to find a particular document would involve searching a list of all "files" on that computer. Today there can be hundreds if not thousands of files recorded on a personal computer's hard disk.

One can think of a directory as being rather like a "folder" into which documents which come under a particular heading are saved. Searching for a document is simplified as one only needs to "look in" the relevant directory.

LIX uses directories to divide up the categories of documents and files that it uses. Among these are the conversion directory (see above) and the wordprocessor program and documents directories.

Most of these directories can be adjusted within the LIX Setup Program (see Section 9), and in some cases LIX needs the information to be able to operate correctly. For example if you have not supplied the correct name of the directory where your wordprocessor program is, you will find the option on the LIX main menu to run your Wordprocessor does not work.

Directories may have sub-directories, so you can construct quite complex logical arrangements, e.g.:

\WP\DOCS\JOHN\TEST.DOC

Describes a document "TEST.DOC" in subdirectory JOHN of subdirectory DOCS of directory WP. Note how you must use the backslash character when you are writing full description of where a document can be found (often referred to as "the full path").

NOTE: If you are wanting to specify a document on another disk or drive from the one in which your computer is presently operating, you must add the "drive specifier" before the "full path", e.g. D:\WP\DOCS\JOHN\TEST.DOC, would specify the same document as above but on drive D. You must always put in the colon.

document transfer

This is the term used to describe what LIX does; transferring documents electronically from one PC to another similarly equipped PC, over the telephone network. This is quite like the way in which a fax machine works, instead of paper though, LIX transfers the WP document in a form that can be used in a wordprocessor.

DOS

Refers to the "Disk Operating System" of your Personal Computer.

In order to get programs to run it used to be necessary for the name of the program to be typed in, which told DOS what program to run. Generally speaking DOS only offers a limited range of facilities, such as listing, copying, deleting and renaming "files" (see directories above).

It is beyond the scope of this manual to describe DOS, and you should refer to the manual that relates to your particular version.

In day to day use you should never need to use DOS once you have run LIX.

With modern PCs it is often the case that a user does not see this level of the computer's operation.

downloaded

This word is used to describe the process of retrieving or receiving a document or "file" (see directories above) from another computer into your own computer.

drive refers to the disk drive (hard disk or diskette) which your computer is instructed to use when looking for documents or files (see full description under directory above).

encryption & encryption key

Encryption is the process of coding text so that others cannot easily read it without knowing the "key" by which it was coded or encrypted.

LIX offers the option, if you compress documents before they are sent, or encrypting them also.

If you choose this option you must remember the word that you type exactly (including whether any letters were in capitals or small). Keys should be a combination of letters and numbers in one string (spaces are not allowed). Using words like "fred" as a key is not likely to be very secure.

DISCLAIMER

LIX does not make any warranty and disclaims any liability in respect of the encryption used. It forms part of the functions offered by PK Ware software included in the LIX package. Encryption with this should deter the idle snooper from gaining easy access to documents sent under LIX.

envelope

LIX uses this word to describe files (see above in the description of directory for an explanation of files) containing documents received by LIX held in mailboxes until "opened" by the user.

An envelope may have a covering message written by the sender. If so LIX will offer you the option to view it and print it when you have selected the envelope, under the Manage Incoming Mail procedure from the Main Menu. Envelopes have the extension ".ZIP" and are all compressed files, to save space on your hard disk and to avoid possible clashes of document names in the same mailbox.

icon(s)

When LIX has a mailbox with something in it, LIX will display an icon ( a rectangle with a border and the name of the mailbox in the top border) on your LIX screen. Each icon has a dark shadow area beneath to give the appearance of three dimensions.

LEXIS

An online full text legal information retrieval system hosted on a computer system in Dayton, Ohio, containing reported English, American and other cases from as early as 1945.

Mailbox(es) (Incoming and Outgoing)

LIX displays icons on its main screen whenever any mailbox contains a document that has been receive or is awaiting collection.

Incoming Mailboxes appear beneath the banner heading tilled "Incoming Mailboxes" on the right side of the LIX screen and Outgoing Mailboxes appear beneath a similar heading on the left side of the LIX screen. Incoming Mailboxes are partly obscured by the Main Menu when it is displayed, but can be seen when LIX is in Receive Mode.

mask

A mask, in the context of document names and file names on your PC's disks, is a way of specifying a selection of them whose names match the mask you supply. For example, the mask:

C: WP DOCS *.DOC

Means a selection of all those documents or files in the subdirectory DOCS of directory WP which have the extension "DOC". Notice the full stop after the asterisk and before the extension. This is important.

For more information an using masks and the extensions used by your wordprocessor on its documents please consult the relevant manual. See also directory, above moderators

Moderators are subscribers to Legal Teleforum who set up conferences (see above). They decide what type of conference it is and control who may participate.

picker

The picker (sometimes called the "file picker") is what appears in LIX when you press ENTER at any prompt for the name of a document (e.g. when Preparing a Transfer). It is a "window" onto the documents and other files in a directory on your PC (see directory for description of files and directories).

To select a document within the picker: use the cursor keys to move the highlight bar around the window (you can use the PgUp and PgDn keys to scroll the window over the full contents of the directory quickly, and the Home and End keys to go to the beginning and end of the list respectively).

When the higlight bar is on the document you want, press ENTER. Then window will disappear and that document will have been selected.

If you find that you are looking at the contents of a directory you do not want, you can traverse the "tree" of directories on your PC by selecting the top left "diamond" character and pressing ENTER, to move up a directory, or any other name which has a diamond next to it (these will be subdirectories).

If you decide not to select any document, press the ESC key to abandon the selection.

If you a lot of files in a directory, the types of documents or files that you see in the picker can be "masked" using the mask facility (see above).

Receive Mode & Send/Receive Mode

To be able to receive documents LIX must be in Receive Mode. Assuming your modem is switched on and connected to a phone line that can receive incoming calls, LIX will deal with any incoming call from another LIX machine automatically and will display icons of incoming mailboxes once a document transfer has been successfully received.

LIX is supplied in the default "auto fall-back" configuration. This means that from most menus of the LIX program, if the user does not take any action for a specified period of time (20 second or 120 seconds when this feature is enabled), LIX will start to "fall back" through each preceding menu until it reaches the Main Menu. After the same period at the Main Menu with no keys being pressed LIX "falls back" into Receive Mode.

When this happens the Main menu disappears and the bottom line of the screen changes to tell you LIX Is ready to receive a call. IF LIX IS NOT GIVING THIS MESSAGE THEN IT IS NOT READY TO RECEIVE.

To put LIX into Send/Receive Mode you must select the top item on the Main Menu and confirm the time (if any) at which you want any queued transfers to begin.

Send/Receive Mode (See also Receive Mode)

Send/Receive Mode is different from Receive Mode in LIX. LIX only goes into Send/Receive Mode when you select the top item on the Main Menu "Enter Send-/Receive Mode" and confirm the time at which you want any queued transfers to begin.

As its name suggests, only in Send/Receive Mode will LIX attempt to send any document transfers queued to be sent or collected.

transfer (see document transfer)

text conferences see conferences in this glossary

We claim:

1. A text messaging system comprising a plurality of terminals interconnectable through a public telephone network, each terminal comprising;
    input means for inputting user-generated text files;
    editing means for editing text files;
    modem means for transmitting text files to another terminal as encoded text characters, and for receiving text files for subsequent review or text editing, said modem means incorporating link error correction means for correcting transmission errors in transmitted or received text files;
    non-volatile store means for storing received text files;
    indicating means for transmitting an indication of the length of a text file, together with said text file; and
    comparing means for detecting the length of a stored text file, and for comparing the detected length of a stored text file with the transmitted indication of the length of said text file.

2. A system according to claim 1, further comprising transmitting means for signalling to cause a re-transmission of said received text file in the event that the two do not correspond.

3. A system according to claim 1, further comprising deleting means for automatically deleting from said store means a transmitted text file after transmission.

4. A system according to claim 1 further comprising means for converting a text format of a file.

5. A system according to claim 1 further comprising means for comparing two versions of the same text file and highlighting differences therebetween.

6. A system according to claim 1 in which the modem means comprise means for answering a telephone line, and are arranged not to require a password and not to deny access to a call in the absence thereof, and not to transmit a password.

7. A system according to claim 1 further comprising means for encrypting text files to encrypted text files, and means for decrypting an encrypted text file.

8. A terminal for a point-to-point text transmission communication system, said terminal comprising a personal computer coupled via an auto-answer modem to a telecommunications network, said terminal providing:
    means for inputting a text message as a sequence of digital text character symbols;
    means for storing an inputted text message;
    means for encoding a text message for transmission and transmitting said text message via a public telecommunications network to a remote personal computer;
    means for receiving an acknowledgement from a remote terminal that a text message transmitted thereto has been received;
    means for automatically re-attempting transmission in the event of absence of said acknowledgment;
    means for receiving and decoding a received text message via said auto-answer modem from a remote terminal;
    mass store means for storing said received text message on a storage medium;
    means for receiving a length signal indicating the length of said received text message;
    means for comparing the length of said stored text message with said length signal;
    means for signalling an acknowledgement of said received text message to said remote terminal when the length of said stored text message coincides with that indicated by said length signal; and
    means for allowing retrieval of said stored received text message from said mass store means.

9. A terminal according to claim 8 comprising file transmission queue management means allowing an operator to specify a plurality of text messages to be transmitted, together with the time of transmission for each, the terminal being arranged to transmit said files unattended by the operator.

* * * * *